United States Patent
Zhou et al.

(10) Patent No.: US 10,462,480 B2
(45) Date of Patent: Oct. 29, 2019

(54) COMPUTATIONALLY EFFICIENT MOTION ESTIMATION

(71) Applicant: Microsoft Technology Licensing, LLC, Redmond, WA (US)

(72) Inventors: You Zhou, Sammamish, WA (US); Chih-Lung Lin, Redmond, WA (US); Binlong Li, Redmond, WA (US); Ming-Chieh Lee, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 731 days.

(21) Appl. No.: 14/587,990

(22) Filed: Dec. 31, 2014

(65) Prior Publication Data

US 2016/0191946 A1    Jun. 30, 2016

(51) Int. Cl.
| | |
|---|---|
| *H04N 19/523* | (2014.01) |
| *H04N 19/82* | (2014.01) |
| *H04N 19/56* | (2014.01) |
| *H04N 19/117* | (2014.01) |
| *H04N 19/137* | (2014.01) |
| *H04N 19/17* | (2014.01) |

(52) U.S. Cl.
CPC ......... *H04N 19/523* (2014.11); *H04N 19/117* (2014.11); *H04N 19/137* (2014.11); *H04N 19/17* (2014.11); *H04N 19/56* (2014.11); *H04N 19/82* (2014.11)

(58) Field of Classification Search
CPC ...... H04N 19/523; H04N 19/82; H04N 19/17; H04N 19/137; H04N 19/56
USPC ................................................... 375/240.16
See application file for complete search history.

(56) References Cited

U.S. PATENT DOCUMENTS

| | | | |
|---|---|---|---|
| 6,363,117 B1 * | 3/2002 | Kok ...................... | H04N 19/17 375/240.24 |
| 7,620,109 B2 | 11/2009 | Srinivasan | |
| 8,265,151 B1 | 9/2012 | Wang et al. | |

(Continued)

FOREIGN PATENT DOCUMENTS

| | | |
|---|---|---|
| CN | 101212672 | 7/2008 |
| CN | 103139561 | 6/2013 |

(Continued)

OTHER PUBLICATIONS

Georgis et al., "Study of interpolation filters for motion estimation with application in H.264/AVC encoders," *IEEE Int'l Conf. on Electronics, Circuits and Systems*, pp. 9-12 (Dec. 2011).

(Continued)

*Primary Examiner* — Zaihan Jiang
(74) *Attorney, Agent, or Firm* — Klarquist Sparkman, LLP

(57) ABSTRACT

The detailed description presents innovations in performing motion estimation during digital video media encoding. In one example embodiment, motion estimation is performed using a lower-complexity sub-pixel interpolation filter configured to compute sub-pixel values for two or more candidate prediction regions at a sub-pixel offset, the two or more candidate prediction regions being located in one or more reference frames. For a selected one of the candidate prediction regions at the sub-pixel offset, motion compensation is performed using a higher-complexity sub-pixel interpolation filter.

17 Claims, 17 Drawing Sheets

(56) References Cited

U.S. PATENT DOCUMENTS

| | | | |
|---|---|---|---|
| 2003/0112864 A1* | 6/2003 | Karczewicz | G06T 3/4007 375/240.01 |
| 2004/0228410 A1 | 11/2004 | Ameres et al. | |
| 2005/0018772 A1* | 1/2005 | Sung | H04N 19/56 375/240.16 |
| 2007/0041445 A1* | 2/2007 | Chen | H04N 19/527 375/240.16 |
| 2008/0181308 A1* | 7/2008 | Wang | H04N 19/105 375/240.16 |
| 2010/0080297 A1* | 4/2010 | Wang | H04N 19/533 375/240.16 |
| 2011/0110420 A1* | 5/2011 | Liang | H04N 19/119 375/240.03 |
| 2012/0328020 A1* | 12/2012 | Lou | H04N 19/61 375/240.16 |
| 2013/0010878 A1* | 1/2013 | Kim | H04N 19/433 375/240.26 |
| 2013/0182770 A1* | 7/2013 | Kondo | H04N 19/139 375/240.16 |
| 2013/0194505 A1* | 8/2013 | Pahalawatta | H04N 5/21 348/607 |
| 2014/0169457 A1* | 6/2014 | Dzik | H04N 19/172 375/240.12 |
| 2015/0172702 A1* | 6/2015 | Wang | H04N 19/80 375/240.17 |

FOREIGN PATENT DOCUMENTS

| | | |
|---|---|---|
| CN | 103686029 | 3/2014 |
| EP | 0825778 | 2/1998 |
| GB | 2379820 | 3/2003 |
| WO | WO 2012/065447 | 5/2012 |

OTHER PUBLICATIONS

Guo et al., "Localized Multiple Adaptive Inerpolation Filters with Single-Pass Encoding," *Visual Communications and Image Processing*, vol. 7744, 8 pp. (Jul. 2010).

International Search Report and Written Opinion dated Jul. 8, 2016, from International Patent Application No. PCT/US2015/067240, 18 pp.

Matsuo et al., "CE3: Modifications of region-based adaptive interpolation filter," JCTVC-F048, 14 pp. (Jul. 2011).

Ng et al., "A Linear Prediction Based Fractional-Pixel Motion Estimation Algorithm," *IEEE Int'l Conf. on Multimedia and Ubiquitous Engineering*, 6 pp. (Aug. 2010).

Rusanovskyy et al., "Spatial and Temporal Adaptation of Interpolation Filter for Low Complexity Encoding/Decoding," *IEEE Workshop on Multimedia Signal Processing*, pp. 163-166 (Oct. 2007).

Xu et al., "A refined motion estimation strategy for adaptive interpolation filter," *Signal Processing: Image Communication*, vol. 25, pp. 121-129 (Feb. 2010).

Yang et al., "Prediction-Based Directional Fractional Pixel Motion Estimation for H.264 Video Coding," *IEEE Int'l Conf. on Acoustics, Speech, and Signal Processing*, pp. 901-904 (Mar. 2005).

Yoon et al., "Macroblock-based Adaptive Interpolation Filter Method using New Filter Selection in H.264/AVC," *IEEE Workshop on Multimedia Signal Processing*, pp. 409-412 (Oct. 2008).

Yoshino et al., "Enhanced Switching of Interpolation Filter for HEVC," JCTVC-C183, 4 pp. (Oct. 2010).

Dai et al., "A Novel Fast Two Step Sub-Pixel Motion Estimation Algorithm in HEVC," *IEEE Int'l Conf. on Acoustics, Speech, and Signal Processing*, pp. 1197-1200 (Mar. 2012).

Dong et al., "Adaptive pre-interpolation filter for high efficiency video coding," *J. Vis. Commun. Image R.*, vol. 22, pp. 697-703 (Nov. 2011).

Georgis et al., "Low Complexity Interpolation Filters for Motion Estimation and Application to the H.264 Encoders," Chapter 6, pp. 137-153 (Jan. 2013).

Toivonen et al., "Efficient Method for Half-Pixel Block Motion Estimation Using Block Differentials," *Proc. Of the 8th Int'l Workshop on Visual Content Processing and Representation*, 8 pp. (Sep. 2003).

Wang et al., "Sub-pixel Motion Compensation Interpolation Filter in AVS," *IEEE Int'l Conf. on Multimedia and Expo*, pp. 93-96 (Jun. 2004).

Written Opinion of the International Preliminary Examining Authority dated Jan. 26, 2017, from International Patent Application No. PCT/US2015/067240, 6 pp.

International Preliminary Report on Patentability dated Apr. 20, 2017, from International Patent Application No. PCT/US2015/067240, 7 pp.

* cited by examiner software 180 implementing one or more
innovations for motion estimation

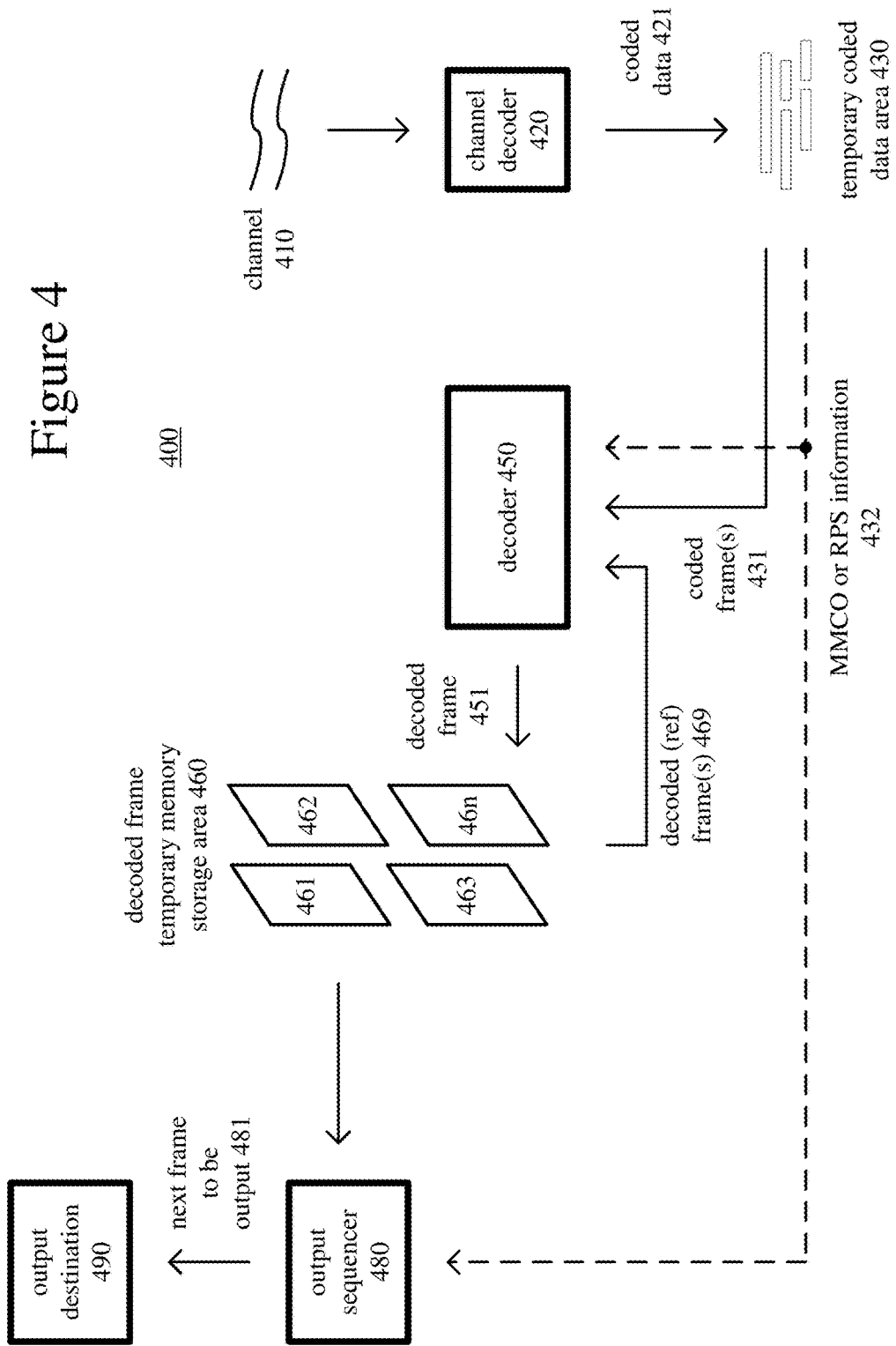

500

Figure 13
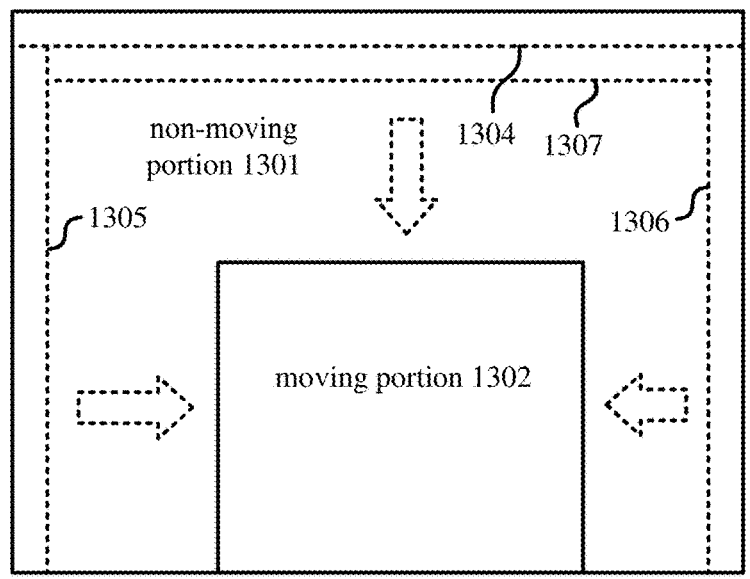
previously encoded picture 1310
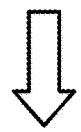
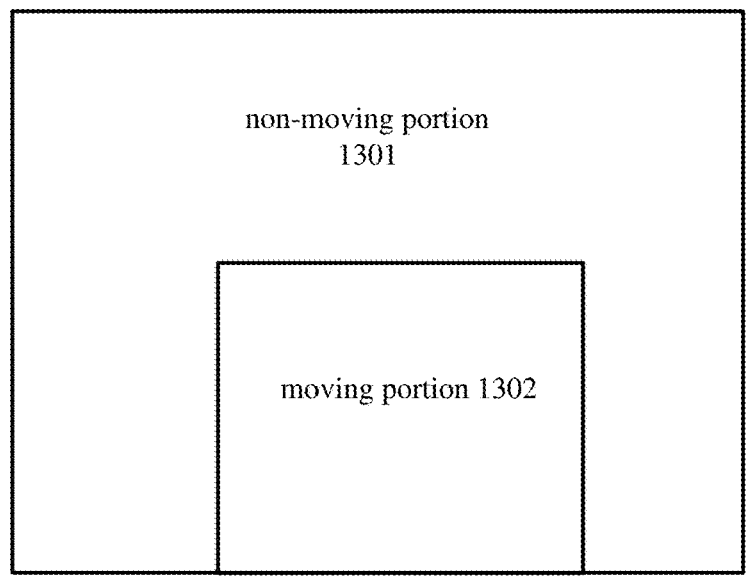
picture 1300 being encoded by video encoder Figure 14
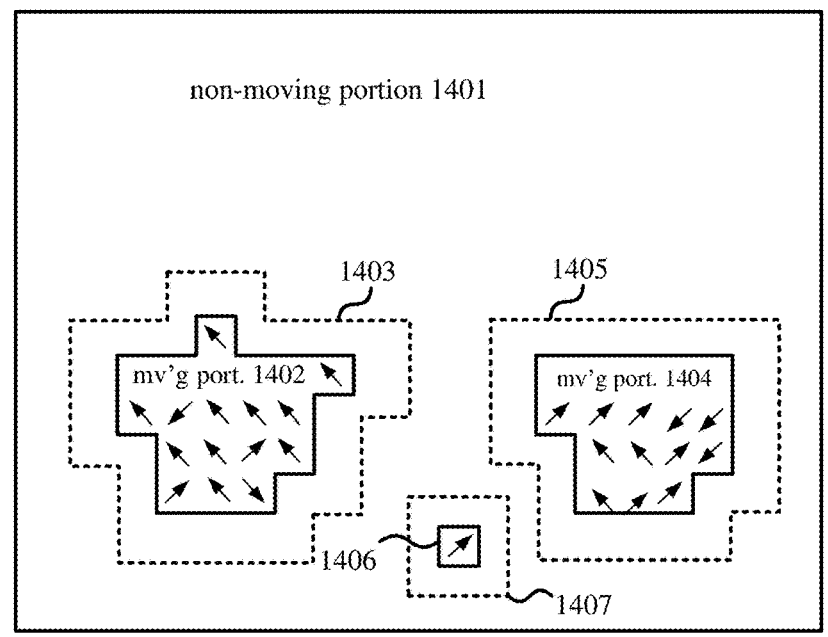
previously encoded picture 1410
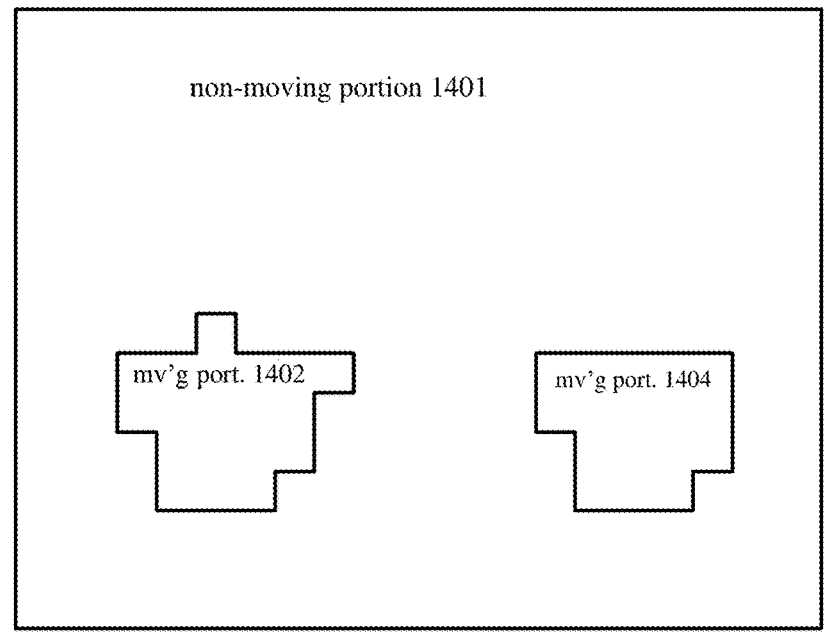
picture 1400 being encoded by video encoder

COMPUTATIONALLY EFFICIENT MOTION ESTIMATION

FIELD

This application relates to digital video encoding and decoding. In particular, this application relates to motion estimation and motion compensation schemes performed during video encoding.

BACKGROUND

Engineers use compression (also called source coding or source encoding) to reduce the bit rate of digital video. Compression decreases the cost of storing and transmitting video information by converting the information into a lower bit rate form. Decompression (also called decoding) reconstructs a version of the original information from the compressed form. A "codec" is an encoder/decoder system.

Over the last two decades, various video codec standards have been adopted, including the ITU-T H.261, H.262 (MPEG-2 or ISO/IEC 13818-2), H.263 and H.264 (MPEG-4 AVC or ISO/IEC 14496-10) standards, the MPEG-1 (ISO/IEC 11172-2) and MPEG-4 Visual (ISO/IEC 14496-2) standards, and the SMPTE 421M (VC-1) standard. More recently, the HEVC standard (ITU-T H.265 or ISO/IEC 23008-2) has been approved. Extensions to the HEVC standard (e.g., for scalable video coding/decoding, for coding/decoding of video with higher fidelity in terms of sample bit depth or chroma sampling rate, or for multi-view coding/decoding) are currently under development. A video codec standard typically defines options for the syntax of an encoded video bitstream, detailing parameters in the bitstream when particular features are used in encoding and decoding. In many cases, a video codec standard also provides details about the decoding operations a decoder should perform to achieve conforming results in decoding. Aside from codec standards, various proprietary codec formats define other options for the syntax of an encoded video bitstream and corresponding decoding operations.

In general, video compression techniques include "intra-picture" compression and "inter-picture" compression. Intra-picture compression techniques compress individual pictures, and inter-picture compression techniques compress pictures with reference to a preceding and/or following picture (often called a reference or anchor picture) or pictures.

Inter-picture compression techniques often use motion estimation and motion compensation to reduce bit rate by exploiting temporal redundancy in a video sequence. Motion estimation is a process for estimating motion between pictures. In one common technique, an encoder using motion estimation attempts to match a current block of sample values in a current picture with a candidate block of the same size in a search area in another picture, the reference picture. When the encoder finds an exact or other match satisfying a closeness criteria in the search area in the reference picture, the encoder parameterizes the change in position between the current and candidate blocks as motion data (such as a motion vector ("MV")). An MV is conventionally a two-dimensional value, having a horizontal MV component that indicates left or right spatial displacement and a vertical MV component that indicates up or down spatial displacement.

An MV can indicate a spatial displacement in terms of an integer number of samples starting from a co-located position in a reference picture for a current block. For example, for a current block at position (32, 16) in a current picture, the MV (−3, 1) indicates position (29, 17) in the reference picture. Or, an MV can indicate a spatial displacement in terms of a fractional number of integer samples from a co-located position in a reference picture for a current block. For example, for a current block at position (32, 16) in a current picture, the MV (−3.5, 1.25) indicates position (28.5, 17.25) in the reference picture. To determine sample values at fractional offsets in the reference picture, the encoder typically interpolates between sample values at integer-sample positions. Such interpolation is referred to as "sub-pixel interpolation" and can be computationally intensive.

In general, motion compensation is a process of reconstructing pictures from reference picture(s) using candidate blocks from a reference picture selected during the motion estimation process. During motion compensation, a decoder also performs the sub-pixel interpolation as needed to compute sample values at fractional offsets in reference pictures.

Encoders typically spend a large proportion of encoding time performing motion estimation, attempting to find good matches from among multiple block candidates in a reference frame and thereby improving rate-distortion performance. Further, newer video codecs tend to employ higher-complexity sub-pixel interpolation schemes. Such higher-complexity sub-pixel interpolation schemes specified by a particular video codec can compound, or otherwise significantly increase, the encoding time and computational burden for motion estimation. This added complexity for motion estimation can be especially burdensome for applications or environments where speed is of importance, such as for real-time encoding environments like video conferencing or video encoding of live events.

SUMMARY

In summary, the detailed description presents innovations in performing motion estimation during digital video media encoding. The innovations in performing motion estimation can be implemented as part of a method, as part of a computing device configured or programmed to perform the method, or as part of a tangible computer-readable media storing computer-executable instructions for causing a computing device to perform the method. The various innovations can be used in combination or separately.

In general, the disclosed innovations facilitate encoding operations with improved computational efficiency, faster speeds, reduced power, and/or reduced memory usage and demand. The approaches described herein for performing motion estimation can be applied when encoding any type of video. In particular, however, performing motion estimation as described herein can improve performance when encoding video content where significant portions of the video frame are inactive (or stationary), thus creating opportunities for using less-precise interpolation schemes without any significant increase in distortion. Such techniques can be effectively used, for example, in video conference applications where only a portion of the video frame comprises an active (or moving) speaker or conference participant.

Embodiments of the disclosed technology decrease the computational complexity of motion estimation by: (a) using simpler sub-pixel interpolation filters having lower computational complexity during motion estimation; and/or (b) reducing (or, in some cases, eliminating) pre-interpolation of sub-pixel values. In such embodiments, motion compensation continues to be performed using a higher-complexity sub-pixel interpolation filter. In one example embodiment, for instance, motion estimation is performed using a first sub-pixel interpolation filter configured to compute sub-pixel values for two or more candidate prediction regions at a sub-pixel offset, the two or more candidate prediction regions being located in one or more reference frames. For at least a selected one of the candidate prediction regions at the sub-pixel offset, motion compensation is performed using a second sub-pixel interpolation filter. In this example embodiment, the first sub-pixel interpolation filter used during motion estimation has a lower computational complexity than the second sub-pixel interpolation filter used during motion compensation In another example embodiment, one sub-pixel interpolation scheme from among multiple available sub-pixel interpolation schemes is adaptively selected for use during a motion estimation process for one or more blocks of video media data in a video frame. A motion estimation process is performed using the selected sub-pixel interpolation scheme. The motion estimation process comprises (a) computing multiple candidate prediction regions from one or more reference frames, the candidate prediction regions predicting motion of the one or more blocks of video media data in a video frame being encoded, at least some of the candidate prediction regions being computed using the adaptively selected sub-pixel interpolation scheme, and (b) selecting one of the candidate prediction regions for the block of video media data from among the multiple candidate prediction regions. A motion compensation process is then performed. In this embodiment, the motion compensation process comprises computing the selected one of the candidate prediction regions using a second sub-pixel interpolation filer, the second sub-pixel interpolation filter having higher computational complexity than the first sub-pixel interpolation filter used during motion estimation.

In another example embodiment, during motion estimation for the frame, first candidate sub-pixel prediction regions are computed for blocks of video media data in a region of a video frame using a first sub-pixel interpolation scheme. During motion estimation for the frame, second candidate prediction regions are computed for blocks of video media data that are in the video frame but outside of the regions using a second sub-pixel interpolation scheme. In this example embodiment, the first sub-pixel interpolation scheme has a higher computational complexity than the second sub-pixel interpolation scheme.

The foregoing and other objects, features, and advantages of the invention will become more apparent from the following detailed description, which proceeds with reference to the accompanying figures.

BRIEF DESCRIPTION OF THE DRAWINGS

FIG. 4 is a diagram of an example decoder system in conjunction with which some described embodiments can be implemented.

FIG. 13 is a schematic block diagram of a picture being encoded by a video encoder having a portion of the picture in which movement is expected to occur and a remainder portion in which no movement, less movement, or less important movement is expected to occur. FIG. 13 also illustrates an example technique for identifying the portion of the picture in which movement is expected to occur.

FIG. 14 is a schematic block diagram of a picture being encoded by a video encoder having multiple portions of the picture in which movement is expected to occur and a remainder portion in which no movement, less movement, or less important movement is expected to occur. FIG. 14 also illustrates an example technique for identifying the portions of the picture in which movement is expected to occur.

FIG. 16 is a schematic block diagram showing integer and associated fractional (sub-pixel) positions.

DETAILED DESCRIPTION

The detailed description presents innovations in performing motion estimation during the encoding of digital video media.

Although operations described herein are in places described as being performed by a video encoder, in many cases the operations can be performed by another type of media processing tool.

Some of the innovations described herein are illustrated with reference to syntax elements and operations specific to the HEVC standard. The innovations described herein can also be implemented for other standards or formats.

More generally, various alternatives to the examples described herein are possible. For example, some of the methods described herein can be altered by changing the ordering of the method acts described, by splitting, repeating, or omitting certain method acts, etc. The various aspects of the disclosed technology can be used in combination or separately. Different embodiments use one or more of the described innovations. Some of the innovations described herein address one or more of the problems noted in the background. Typically, a given technique/tool does not solve all such problems.

I. Example Computing Systems

Figure 1:
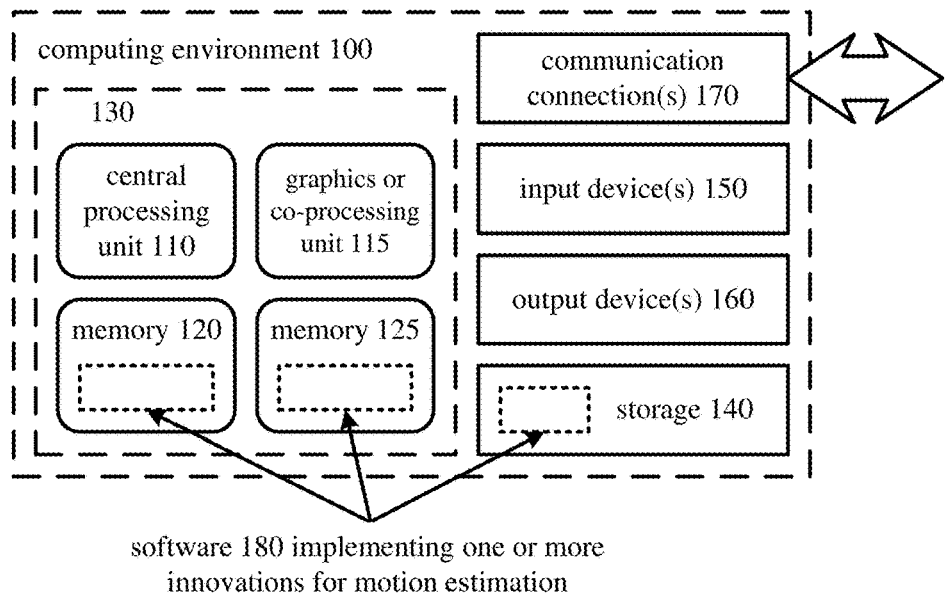
FIG. 1 is a diagram of an example computing system in which some described embodiments can be implemented.

FIG. 1 illustrates a generalized example of a suitable computing system (100) in which several of the described innovations may be implemented. The computing system (100) is not intended to suggest any limitation as to scope of use or functionality, as the innovations may be implemented in diverse general-purpose or special-purpose computing systems.

With reference to FIG. 1, the computing system (100) includes one or more processing units (110, 115) and memory (120, 125). The processing units (110, 115) execute computer-executable instructions. A processing unit can be a general-purpose central processing unit ("CPU"), processor in an application-specific integrated circuit ("ASIC") (such as a system on a chip ("SOC") or any other type of processor. In a multi-processing system, multiple processing units execute computer-executable instructions to increase processing power. For example, FIG. 1 shows a central processing unit (110) as well as a graphics processing unit or co-processing unit (115). The tangible memory (120, 125) may be volatile memory (e.g., registers, cache, RAM), non-volatile memory (e.g., ROM, EEPROM, flash memory, etc.), or some combination of the two, accessible by the processing unit(s). The memory (120, 125) stores software (180) implementing one or more innovations for performing motion estimation during encoding as disclosed herein, in the form of computer-executable instructions suitable for execution by the processing unit(s).

A computing system may have additional features. For example, the computing system (100) includes storage (140), one or more input devices (150), one or more output devices (160), and one or more communication connections (170). An interconnection mechanism (not shown) such as a bus, controller, or network interconnects the components of the computing system (100). Typically, operating system software (not shown) provides an operating environment for other software executing in the computing system (100), and coordinates activities of the components of the computing system (100).

The tangible storage (140) may be removable or non-removable, and includes magnetic disks, solid state drives, magnetic tapes or cassettes, CD-ROMs, DVDs, or any other medium which can be used to store information and which can be accessed within the computing system (100). The storage (140) stores instructions for the software (180) implementing one or more innovations for performing motion estimation during encoding as disclosed herein.

The input device(s) (150) may be a touch input device such as a keyboard, mouse, pen, or trackball, a voice input device, a scanning device, or another device that provides input to the computing system (100). For video, the input device(s) (150) may be a camera, video card, TV tuner card, screen capture module, or similar device that accepts video input in analog or digital form, or a CD-ROM, CD-RW, or DVD that reads video input into the computing system (100). The output device(s) (160) may be a display, printer, speaker, CD-writer, DVD-writer, or another device that provides output from the computing system (100).

The communication connection(s) (170) enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the general context of computer-readable media. Computer-readable media are any available tangible media that can be accessed within a computing environment. By way of example, and not limitation, with the computing system (100), computer-readable media include memory (120, 125), storage (140), and combinations of any of the above.

The innovations can be described in the general context of computer-executable instructions, such as those included in program modules, being executed in a computing system on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing system.

The terms "system" and "device" are used interchangeably herein. Unless the context clearly indicates otherwise, neither term implies any limitation on a type of computing system or computing device. In general, a computing system or computing device can be local or distributed, and can include any combination of special-purpose hardware and/or general-purpose hardware with software implementing the functionality described herein.

The disclosed methods can also be implemented using specialized computing hardware configured to perform any of the disclosed methods. For example, the disclosed methods can be implemented by an integrated circuit (e.g., an ASIC (such as an ASIC digital signal processor ("DSP"), a graphics processing unit ("GPU"), or a programmable logic device ("PLD"), such as a field programmable gate array ("FPGA")) specially designed or configured to implement any of the disclosed methods. For instance, the disclosed methods can be incorporated into specialized hardware adapted to perform real-time video encoding for facilitating video conferencing, digital encoding of live events (e.g., live sporting events), or other such video application that demand fast, computationally efficient encoding.

For the sake of presentation, the detailed description uses terms like "determine" and "use" to describe operations in a computing system. These terms are high-level abstractions for operations performed by computing hardware, and should not be confused with acts performed by a human being. The actual computer operations corresponding to these terms vary depending on implementation.

II. Example Network Environments

Figure 2A:
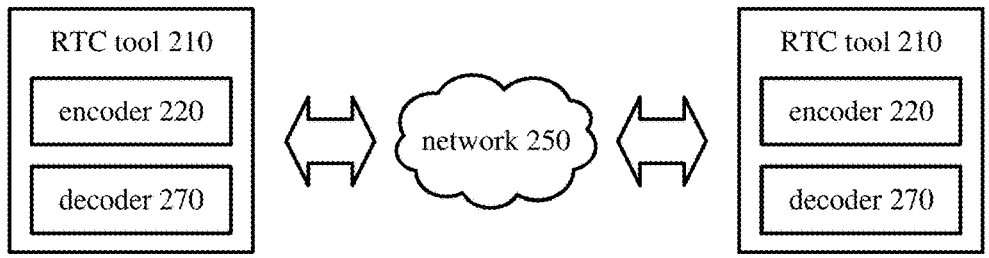
FIGS. 2a and 2b are diagrams of example network environments in which some described embodiments can be implemented.
Figure 2B:
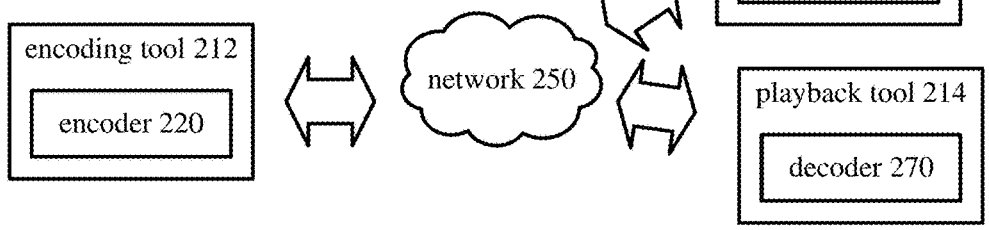

FIGS. 2a and 2b show example network environments (201, 202) that include video encoders (220) and video decoders (270). The encoders (220) and decoders (270) are connected over a network (250) using an appropriate communication protocol. The network (250) can include the Internet or another computer network.

In the network environment (201) shown in FIG. 2a, each real-time communication ("RTC") tool (210) includes both an encoder (220) and a decoder (270) for bidirectional communication. A given encoder (220) can produce output compliant with a variation or extension of the HEVC standard (also known as H.265), SMPTE 421M standard, ISO-IEC 14496-10 standard (also known as H.264 or AVC), another standard, or a proprietary format, with a corresponding decoder (270) accepting encoded data from the encoder (220). The bidirectional communication can be part of a video conference, video telephone call, or other two-party or multi-party communication scenario. Although the network environment (201) in FIG. 2a includes two real-time communication tools (210), the network environment (201) can instead include three or more real-time communication tools (210) that participate in multi-party communication.

Figure 3:
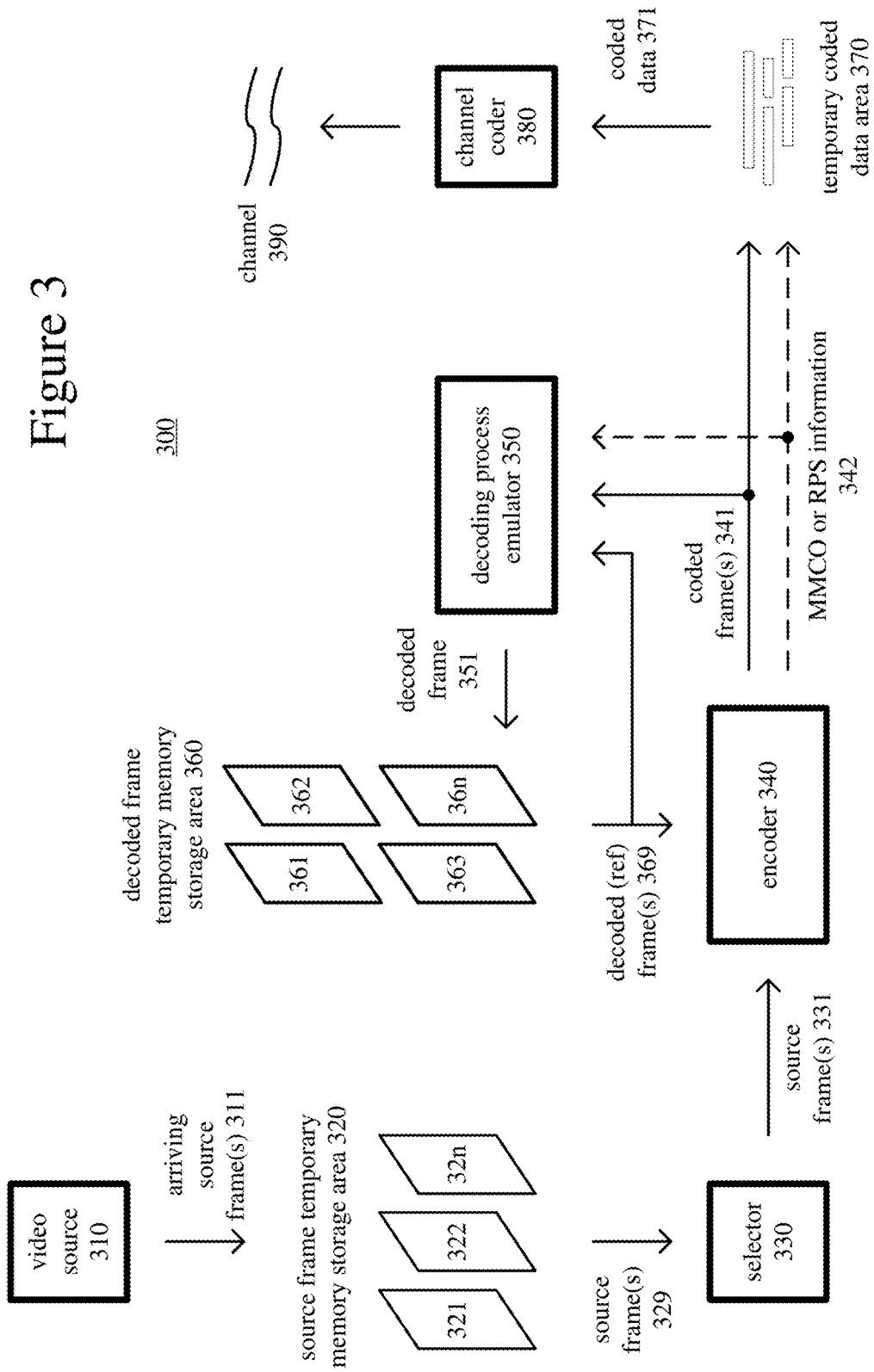
FIG. 3 is a diagram of an example encoder system in conjunction with which some described embodiments can be implemented.

A real-time communication tool (210) manages encoding by an encoder (220). FIG. 3 shows an example encoder system (300) that can be included in the real-time communication tool (210). Alternatively, the real-time communication tool (210) uses another encoder system. A real-time communication tool (210) also manages decoding by a decoder (270). FIG. 4 shows an example decoder system (400), which can be included in the real-time communication tool (210). Alternatively, the real-time communication tool (210) uses another decoder system.

In the network environment (202) shown in FIG. 2b, an encoding tool (212) includes an encoder (220) that encodes video for delivery to multiple playback tools (214), which include decoders (270). The unidirectional communication can be provided for a digital video transmission (e.g., for transmission by a TV network), video surveillance system, web camera monitoring system, screen capture module, remote desktop conferencing presentation or other scenario in which video is encoded and sent from one location to one or more other locations. Although the network environment (202) in FIG. 2b includes two playback tools (214), the network environment (202) can include more or fewer playback tools (214). In general, a playback tool (214) communicates with the encoding tool (212) to determine a stream of video for the playback tool (214) to receive. The playback tool (214) receives the stream, buffers the received encoded data for an appropriate period, and begins decoding and playback.

FIG. 3 shows an example encoder system (300) that can be included in the encoding tool (212). Alternatively, the encoding tool (212) uses another encoder system. The encoding tool (212) can also include server-side controller logic for managing connections with one or more playback tools (214). FIG. 4 shows an example decoder system (400), which can be included in the playback tool (214). Alternatively, the playback tool (214) uses another decoder system. A playback tool (214) can also include client-side controller logic for managing connections with the encoding tool (212).

III. Example Encoder Systems

FIG. 3 is a block diagram of an example encoder system (300) in conjunction with which some described embodiments may be implemented. The encoder system (300) can be a encoding tool capable of operating in any of multiple encoding modes such as a low-latency encoding mode for real-time communication, a transcoding mode, and a higher-latency encoding mode for producing media for playback from a file or stream, or it can be a encoding tool adapted for one such encoding mode. The encoder system (300) can be implemented as an operating system module, as part of an application library or as a standalone application. Overall, the encoder system (300) receives a sequence of source video frames (311) from a video source (310) and produces encoded data as output to a channel (390). The encoded data output to the channel can include content encoded using any of the motion estimation schemes disclosed herein.

The video source (310) can be a camera, tuner card, storage media, screen capture module, or other digital video source. The video source (310) produces a sequence of video frames at a frame rate of, for example, 30 frames per second. As used herein, the term "frame" generally refers to source, coded or reconstructed image data. For progressive-scan video, a frame is a progressive-scan video frame. For interlaced video, in example embodiments, an interlaced video frame might be de-interlaced prior to encoding. Alternatively, two complementary interlaced video fields are encoded together as a single video frame or encoded as two separately-encoded fields. Aside from indicating a progressive-scan video frame or interlaced-scan video frame, the term "frame" or "picture" can indicate a single non-paired video field, a complementary pair of video fields, a video object plane that represents a video object at a given time, or a region of interest in a larger image. The video object plane or region can be part of a larger image that includes multiple objects or regions of a scene.

An arriving source frame (311) is stored in a source frame temporary memory storage area (320) that includes multiple frame buffer storage areas (321, 322, . . . , 32n). A frame buffer (321, 322, etc.) holds one source frame in the source frame storage area (320). After one or more of the source frames (311) have been stored in frame buffers (321, 322, etc.), a frame selector (330) selects an individual source frame from the source frame storage area (320). The order in which frames are selected by the frame selector (330) for input to the encoder (340) may differ from the order in which the frames are produced by the video source (310), e.g., the encoding of some frames may be delayed in order, so as to allow some later frames to be encoded first and to thus facilitate temporally backward prediction. Before the encoder (340), the encoder system (300) can include a pre-processor (not shown) that performs pre-processing (e.g., filtering) of the selected frame (331) before encoding. The pre-processing can include color space conversion into primary (e.g., luma) and secondary (e.g., chroma differences toward red and toward blue) components and resampling processing (e.g., to reduce the spatial resolution of chroma components) for encoding. Typically, before encoding, video has been converted to a color space such as YUV, in which sample values of a luma (Y) component represent brightness or intensity values, and sample values of chroma (U, V) components represent color-difference values. The chroma sample values may be sub-sampled to a lower chroma sampling rate (e.g., for YUV 4:2:0 format or YUV 4:2:2), or the chroma sample values may have the same resolution as the luma sample values (e.g., for YUV 4:4:4 format). In YUV 4:2:0 format, chroma components are downsampled by a factor of two horizontally and by a factor of two vertically. In YUV 4:2:2 format, chroma components are downsampled by a factor of two horizontally. Or, the video can be encoded in another format (e.g., RGB 4:4:4 format).

The encoder (340) encodes the selected frame (331) to produce a coded frame (341) and also produces memory management control operation ("MMCO") signals (342) or reference picture set ("RPS") information. If the current frame is not the first frame that has been encoded, when performing its encoding process, the encoder (340) may use one or more previously encoded/decoded frames (369) that have been stored in a decoded frame temporary memory storage area (360). Such stored decoded frames (369) are used as reference frames for inter-frame prediction of the content of the current source frame (331). The MMCO/RPS information (342) indicates to a decoder which reconstructed frames may be used as reference frames, and hence should be stored in a frame storage area.

Generally, the encoder (340) includes multiple encoding modules that perform encoding tasks such as partitioning into tiles, intra prediction estimation and prediction, motion estimation and compensation, frequency transforms, quantization and entropy coding. The exact operations performed by the encoder (340) can vary depending on compression format. The format of the output encoded data can be a variation or extension of HEVC format (H.265), Windows Media Video format, VC-1 format, MPEG-x format (e.g., MPEG-1, MPEG-2, or MPEG-4), H.26x format (e.g., H.261, H.262, H.263, H.264), or another format.

The encoder (340) can partition a frame into multiple tiles of the same size or different sizes. For example, the encoder (340) splits the frame along tile rows and tile columns that, with frame boundaries, define horizontal and vertical boundaries of tiles within the frame, where each tile is a rectangular region. Tiles are often used to provide options for parallel processing. A frame can also be organized as one or more slices, where a slice can be an entire frame or region of the frame. A slice can be decoded independently of other slices in a frame, which improves error resilience. The content of a slice or tile is further partitioned into blocks or other sets of samples for purposes of encoding and decoding.

For syntax according to the HEVC standard, the encoder splits the content of a frame (or slice or tile) into coding tree units. A coding tree unit ("CTU") includes luma sample values organized as a luma coding tree block ("CTB") and corresponding chroma sample values organized as two chroma CTBs. The size of a CTU (and its CTBs) is selected by the encoder, and can be, for example, 64×64, 32×32 or 16×16 sample values. A CTU includes one or more coding units. A coding unit ("CU") has a luma coding block ("CB") and two corresponding chroma CBs. For example, a CTU with a 64×64 luma CTB and two 64×64 chroma CTBs (YUV 4:4:4 format) can be split into four CUs, with each CU including a 32×32 luma CB and two 32×32 chroma CBs, and with each CU possibly being split further into smaller CUs. Or, as another example, a CTU with a 64×64 luma CTB and two 32×32 chroma CTBs (YUV 4:2:0 format) can be split into four CUs, with each CU including a 32×32 luma CB and two 16×16 chroma CBs, and with each CU possibly being split further into smaller CUs. The smallest allowable size of CU (e.g., 8×8, 16×16) can be signaled in the bitstream.

Generally, a CU has a prediction mode such as inter or intra. A CU includes one or more prediction units for purposes of signaling of prediction information (such as prediction mode details, displacement values, etc.) and/or prediction processing. A prediction unit ("PU") has a luma prediction block ("PB") and two chroma PBs. For an intra-predicted CU, the PU has the same size as the CU, unless the CU has the smallest size (e.g., 8×8). In that case, the CU can be split into four smaller PUs (e.g., each 4×4 if the smallest CU size is 8×8) or the PU can have the smallest CU size, as indicated by a syntax element for the CU. A CU also has one or more transform units for purposes of residual coding/decoding, where a transform unit ("TU") has a transform block ("TB") and two chroma TBs. A PU in an intra-predicted CU may contain a single TU (equal in size to the PU) or multiple TUs. As used herein, the term "block" can indicate a CB, PB, TB or other set of sample values, depending on context. The encoder decides how to partition video into CTUs, CUs, PUs, TUs, etc.

Returning to FIG. 3, the encoder represents an intra-coded block of a source frame (331) in terms of prediction from other, previously reconstructed sample values in the frame (331). For intra BC prediction, an intra-picture estimator estimates displacement of a block with respect to the other, previously reconstructed sample values. An intra-frame prediction reference region (or intra-prediction region, for short) is a region of samples in the frame that are used to generate BC-prediction values for the block. The intra-frame prediction region can be indicated with a block vector ("BV") value (determined in BV estimation). For intra spatial prediction for a block, the intra-picture estimator estimates extrapolation of the neighboring reconstructed sample values into the block. The intra-picture estimator can output prediction information (such as BV values for intra BC prediction or prediction mode (direction) for intra spatial prediction), which is entropy coded. An intra-frame prediction predictor applies the prediction information to determine intra prediction values.

The encoder (340) represents an inter-frame coded, predicted block of a source frame (331) in terms of prediction from reference frames. A motion estimator estimates the motion of the block with respect to one or more reference frames (369). When multiple reference frames are used, the multiple reference frames can be from different temporal directions or the same temporal direction. The motion estimator can use any of the motion estimation techniques disclosed herein. For example, the motion estimator can use sub-pixel interpolation schemes that are more computationally efficient than the sub-pixel interpolation scheme used during motion compensation. Such sub-pixel interpolation schemes for motion estimation can decrease computational complexity, increase the speed with which motion estimation is performed, and reduce memory demand and usage. In some embodiments, the motion estimator can adaptively select a sub-pixel motion estimation scheme (including a computationally efficient scheme relative to the sub-pixel interpolation scheme used during compensation) from among multiple sub-pixel interpolation schemes to realize similar benefits. Still further, the motion estimator can use a sub-pixel interpolation scheme that is more computationally efficient for a portion of a frame, and use a different less-computationally-efficient sub-pixel interpolation scheme for a remainder of the frame.

A motion-compensated prediction reference region is a region of samples in the reference frame(s) that is used to generate motion-compensated prediction values for a block of samples of a current frame. The motion estimator outputs motion information such as MV information, which is entropy coded.

The encoder can determine the differences (if any) between a block's prediction values (intra or inter) and corresponding original values. These prediction residual values are further encoded using a frequency transform, quantization and entropy encoding. For example, the encoder (340) sets values for quantization parameter ("QP") for a picture, tile, slice and/or other portion of video, and quantizes transform coefficients accordingly. The entropy coder of the encoder (340) compresses quantized transform coefficient values as well as certain side information (e.g., MV information, BV values, QP values, mode decisions, parameter choices). Typical entropy coding techniques include Exponential-Golomb coding, Golomb-Rice coding, arithmetic coding, differential coding, Huffman coding, run length coding, variable-length-to-variable-length ("V2V") coding, variable-length-to-fixed-length ("V2F") coding, Lempel-Ziv ("LZ") coding, dictionary coding, probability interval partitioning entropy coding ("PIPE"), and combinations of the above. The entropy coder can use different coding techniques for different kinds of information, can apply multiple techniques in combination (e.g., by applying Golomb-Rice coding followed by arithmetic coding), and can choose from among multiple code tables within a particular coding technique.

An adaptive deblocking filter is included within the motion compensation loop in the encoder (340) to smooth discontinuities across block boundary rows and/or columns in a decoded frame. Other filtering (such as de-ringing filtering, adaptive loop filtering ("ALF"), or sample-adaptive offset ("SAO") filtering; not shown) can alternatively or additionally be applied as in-loop filtering operations.

The coded frames (341) and MMCO/RPS information (342) (or information equivalent to the MMCO/RPS information (342), since the dependencies and ordering structures for frames are already known at the encoder (340)) are processed by a decoding process emulator (350). The decoding process emulator (350) implements some of the functionality of a decoder, for example, decoding tasks to reconstruct reference frames. In a manner consistent with the MMCO/RPS information (342), the decoding process emulator (350) determines whether a given coded frame (341) needs to be reconstructed and stored for use as a reference frame in inter-frame prediction of subsequent frames to be encoded. If a coded frame (341) needs to be stored, the decoding process emulator (350) models the decoding process that would be conducted by a decoder that receives the coded frame (341) and produces a corresponding decoded frame (351). In doing so, when the encoder (340) has used decoded frame(s) (369) that have been stored in the decoded frame storage area (360), the decoding process emulator (350) also uses the decoded frame(s) (369) from the storage area (360) as part of the decoding process.

The decoded frame temporary memory storage area (360) includes multiple frame buffer storage areas (361, 362, ..., 36n). In a manner consistent with the MMCO/RPS information (342), the decoding process emulator (350) manages the contents of the storage area (360) in order to identify any frame buffers (361, 362, etc.) with frames that are no longer needed by the encoder (340) for use as reference frames. After modeling the decoding process, the decoding process emulator (350) stores a newly decoded frame (351) in a frame buffer (361, 362, etc.) that has been identified in this manner.

The coded frames (341) and MMCO/RPS information (342) are buffered in a temporary coded data area (370). The coded data that is aggregated in the coded data area (370) contains, as part of the syntax of an elementary coded video bitstream, encoded data for one or more pictures. The coded data that is aggregated in the coded data area (370) can also include media metadata relating to the coded video data (e.g., as one or more parameters in one or more supplemental enhancement information ("SEI") messages or video usability information ("VUI") messages).

The aggregated data (371) from the temporary coded data area (370) are processed by a channel encoder (380). The channel encoder (380) can packetize and/or multiplex the aggregated data for transmission or storage as a media stream (e.g., according to a media program stream or transport stream format such as ITU-T H.222.01 ISO/IEC 13818-1 or an Internet real-time transport protocol format such as IETF RFC 3550), in which case the channel encoder (380) can add syntax elements as part of the syntax of the media transmission stream. Or, the channel encoder (380) can organize the aggregated data for storage as a file (e.g., according to a media container format such as ISO/IEC 14496-12), in which case the channel encoder (380) can add syntax elements as part of the syntax of the media storage file. Or, more generally, the channel encoder (380) can implement one or more media system multiplexing protocols or transport protocols, in which case the channel encoder (380) can add syntax elements as part of the syntax of the protocol(s). The channel encoder (380) provides output to a channel (390), which represents storage, a communications connection, or another channel for the output. The channel encoder (380) or channel (390) may also include other elements (not shown), e.g., for forward-error correction ("FEC") encoding and analog signal modulation.

IV. Example Decoder Systems

FIG. 4 is a block diagram of an example decoder system (400) in conjunction with which some described embodiments can be implemented. The decoder system (400) can be a decoding tool capable of operating in any of multiple decoding modes such as a low-latency decoding mode for real-time communication and a higher-latency decoding mode for media playback from a file or stream, or it can be a decoding tool adapted for one such decoding mode. The decoder system (400) can be implemented as an operating system module, as part of an application library or as a standalone application. Overall, the decoder system (400) receives coded data from a channel (410) and produces reconstructed frames as output for an output destination (490).

The decoder system (400) includes a channel (410), which can represent storage, a communications connection, or another channel for coded data as input. The channel (410) produces coded data that has been channel coded. A channel decoder (420) can process the coded data. For example, the channel decoder (420) de-packetizes and/or demultiplexes data that has been aggregated for transmission or storage as a media stream (e.g., according to a media program stream or transport stream format such as ITU-T H.222.0 I ISO/IEC 13818-1 or an internet real-time transport protocol format such as IETF RFC 3550), in which case the channel decoder (420) can parse syntax elements added as part of the syntax of the media transmission stream. Or, the channel decoder (420) separates coded video data that has been aggregated for storage as a file (e.g., according to a media container format such as ISO/IEC 14496-12), in which case the channel decoder (420) can parse syntax elements added as part of the syntax of the media storage file. Or, more generally, the channel decoder (420) can implement one or more media system demultiplexing protocols or transport protocols, in which case the channel decoder (420) can parse syntax elements added as part of the syntax of the protocol(s). The channel (410) or channel decoder (420) may also include other elements (not shown), e.g., for FEC decoding and analog signal demodulation.

The coded data (421) that is output from the channel decoder (420) is stored in a temporary coded data area (430) until a sufficient quantity of such data has been received. The coded data (421) includes coded frames (431) and MMCO/RPS information (432). The coded data (421) in the coded data area (430) contain, as part of the syntax of an elementary coded video bitstream, coded data for one or more pictures. The coded data (421) in the coded data area (430) can also include media metadata relating to the encoded video data (e.g., as one or more parameters in one or more SEI messages or VUI messages).

In general, the coded data area (430) temporarily stores coded data (421) until such coded data (421) is used by the decoder (450). At that point, coded data for a coded frame (431) and MMCO/RPS information (432) are transferred from the coded data area (430) to the decoder (450). As decoding continues, new coded data is added to the coded data area (430) and the oldest coded data remaining in the coded data area (430) is transferred to the decoder (450).

The decoder (450) decodes a coded frame (431) to produce a corresponding decoded frame (451). As appropriate, when performing its decoding process, the decoder (450) may use one or more previously decoded frames (469) as reference frames for inter-frame prediction. The decoder (450) reads such previously decoded frames (469) from a decoded frame temporary memory storage area (460). Generally, the decoder (450) includes multiple decoding modules that perform decoding tasks such as entropy decoding, intra-frame prediction, motion-compensated inter-frame prediction, inverse quantization, inverse frequency transforms, and merging of tiles. The exact operations performed by the decoder (450) can vary depending on compression format.

For example, the decoder (450) receives encoded data for a compressed frame or sequence of frames and produces output including decoded frame (451). In the decoder (450), a buffer receives encoded data for a compressed frame and, at an appropriate time, makes the received encoded data available to an entropy decoder. The entropy decoder entropy decodes entropy-coded quantized data as well as entropy-coded side information, typically applying the inverse of entropy encoding performed in the encoder. A motion compensator applies motion information to one or more reference frames to form motion-compensated prediction values for any inter-coded blocks of the frame being reconstructed. An intra-frame prediction module can spatially predict sample values of a current block from neighboring, previously reconstructed sample values or, for intra BC prediction, predict sample values of a current block using previously reconstructed sample values of an intra-frame prediction region in the frame. The intra-frame prediction region can be indicated with a BV value. The decoder (450) also reconstructs prediction residual values. An inverse quantizer inverse quantizes entropy-decoded data. For example, the decoder (450) sets values for QP for a picture, tile, slice and/or other portion of video based on syntax elements in the bitstream, and inverse quantizes transform coefficients accordingly. An inverse frequency transformer converts the quantized, frequency-domain data into spatial-domain data. For an inter-frame predicted block, the decoder (450) combines reconstructed prediction residual values with motion-compensated prediction values. The decoder (450) can similarly combine prediction residual values with prediction values from intra-frame prediction. An adaptive deblocking filter is included within the motion compensation loop in the video decoder (450) to smooth discontinuities across block boundary rows and/or columns in the decoded frame (451). Other filtering (such as de-ringing filtering, ALF, or SAO filtering; not shown) can alternatively or additionally be applied as in-loop filtering operations.

The decoded frame temporary memory storage area (460) includes multiple frame buffer storage areas (461, 462, ..., 46n). The decoded frame storage area (460) is an example of a decoded picture buffer. The decoder (450) uses the MMCO/RPS information (432) to identify a frame buffer (461, 462, etc.) in which it can store a decoded frame (451). The decoder (450) stores the decoded frame (451) in that frame buffer.

An output sequencer (480) identifies when the next frame to be produced in output order is available in the decoded frame storage area (460). When the next frame (481) to be produced in output order is available in the decoded frame storage area (460), it is read by the output sequencer (480) and output to the output destination (490) (e.g., display). In general, the order in which frames are output from the decoded frame storage area (460) by the output sequencer (480) may differ from the order in which the frames are decoded by the decoder (450).

V. Example Video Encoders

Figure 5A:
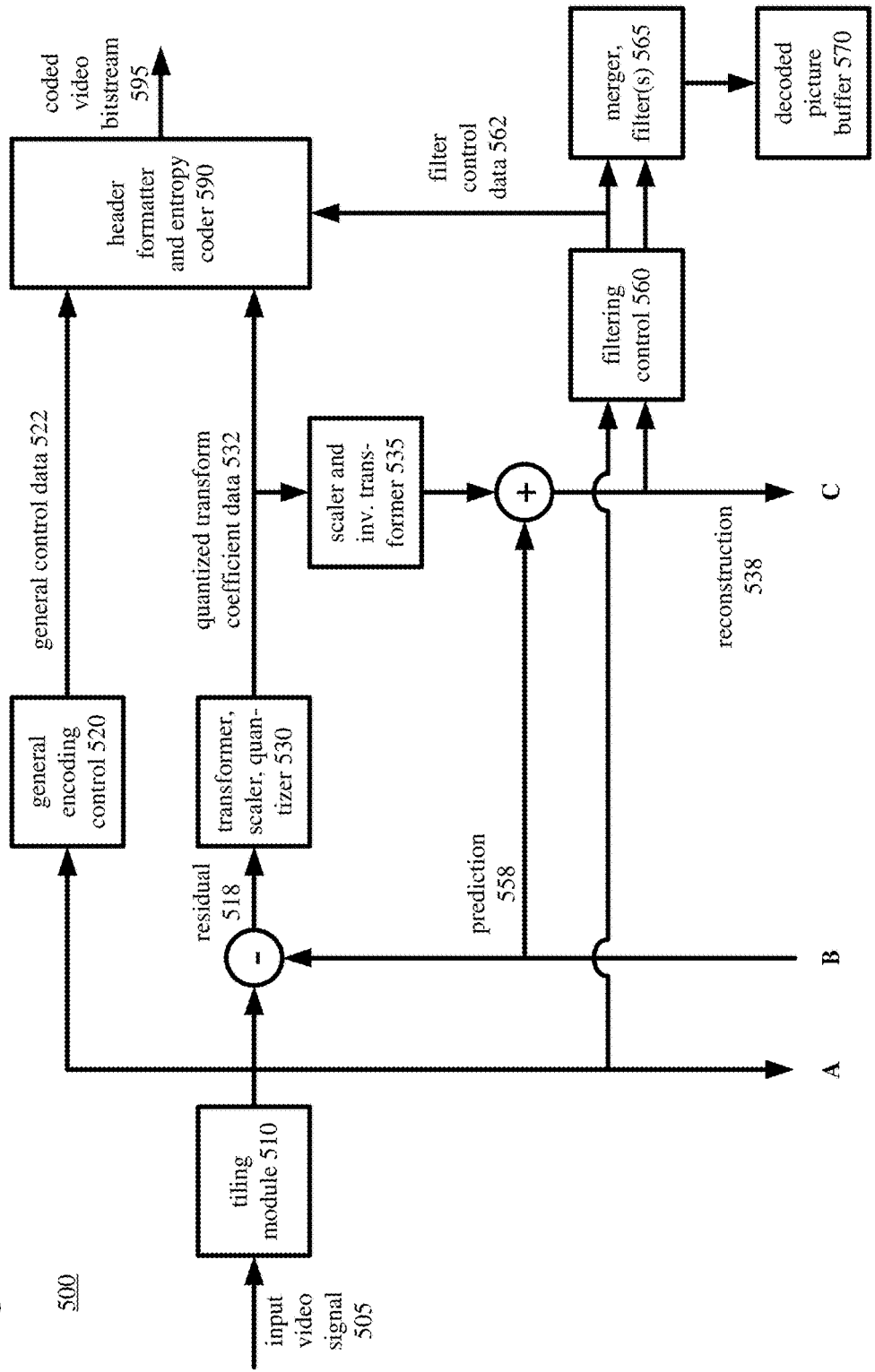
FIGS. 5a and 5b are diagrams illustrating an example video encoder in conjunction with which some described embodiments can be implemented.
Figure 5B:
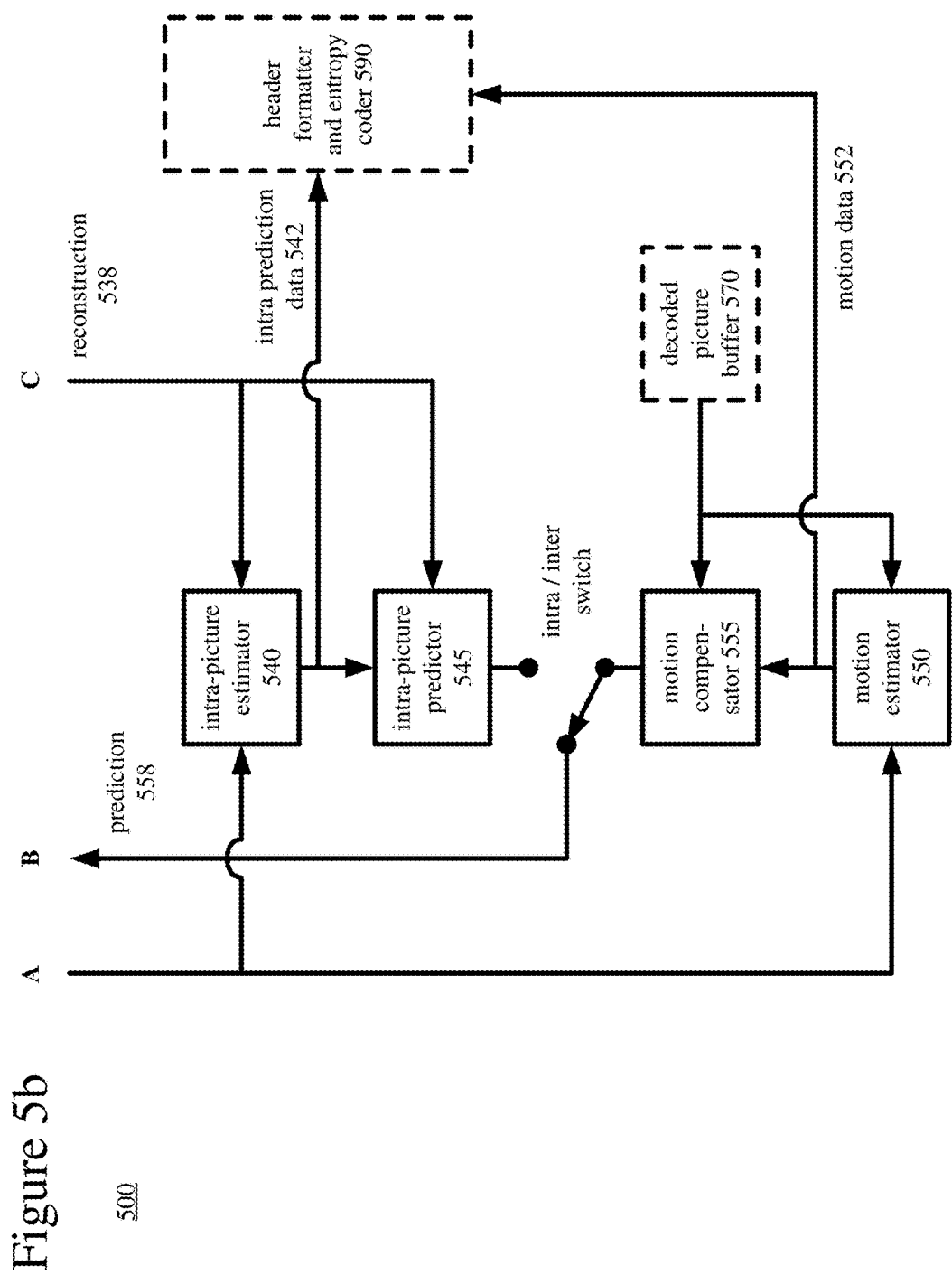

FIGS. 5a and 5b are a block diagram of a generalized video encoder (500) in conjunction with which some described embodiments may be implemented. The encoder (500) receives a sequence of video pictures including a current picture as an input video signal (505) and produces encoded data in a coded video bitstream (595) as output.

The encoder (500) is block-based and uses a block format that depends on implementation. Blocks may be further sub-divided at different stages, e.g., at the prediction, frequency transform and/or entropy encoding stages. For example, a picture can be divided into 64×64 blocks, 32×32 blocks or 16×16 blocks, which can in turn be divided into smaller blocks of sample values for coding and decoding. In implementations of encoding for the HEVC standard, the encoder partitions a picture into CTUs (CTBs), CUs (CBs), PUs (PBs) and TU (TBs).

The encoder (500) compresses pictures using intra-picture coding and/or inter-picture coding. Many of the components of the encoder (500) are used for both intra-picture coding and inter-picture coding. The exact operations performed by those components can vary depending on the type of information being compressed.

A tiling module (510) optionally partitions a picture into multiple tiles of the same size or different sizes. For example, the tiling module (510) splits the picture along tile rows and tile columns that, with picture boundaries, define horizontal and vertical boundaries of tiles within the picture, where each tile is a rectangular region.

The general encoding control (520) receives pictures for the input video signal (505) as well as feedback (not shown) from various modules of the encoder (500). Overall, the general encoding control (520) provides control signals (not shown) to other modules (such as the tiling module (510), transformer/scaler/quantizer (530), scaler/inverse transformer (535), intra-picture estimator (540), motion estimator (550) and intra/inter switch) to set and change coding parameters during encoding. In particular, in conjunction with the motion estimator (550), the general encoding control (520) can be used to perform any of the disclosed techniques for motion estimation. The general encoding control (520) can also evaluate intermediate results during encoding, for example, performing rate-distortion analysis. The general encoding control (520) produces general control data (522) that indicates decisions made during encoding, so that a corresponding decoder can make consistent decisions. The general control data (522) is provided to the header formatter/entropy coder (590).

If the current picture is predicted using inter-picture prediction, a motion estimator (550) estimates the motion of blocks of sample values of the current picture of the input video signal (505) with respect to one or more reference pictures. The motion estimator (550) can perform any of the motion estimation techniques described herein. For example, the motion estimator (550) can use sub-pixel interpolation schemes that are more computationally efficient than the sub-pixel interpolation scheme used during motion compensation. Such sub-pixel interpolation schemes for motion estimation can decrease computational complexity, increase the speed with which motion estimation is performed, and reduce memory demand and usage. In some embodiments, the motion estimator (550) can adaptively select a sub-pixel motion estimation scheme (including a computationally efficient scheme relative to the sub-pixel interpolation scheme used during compensation) from among multiple sub-pixel interpolation schemes to realize similar benefits. Still further, the motion estimator (550) can use a sub-pixel interpolation scheme that is more computationally efficient for a portion of a frame, and use a different less-computationally-efficient sub-pixel interpolation scheme for a remainder of the frame.

The decoded picture buffer (570) buffers one or more reconstructed previously coded pictures for use as reference pictures. When multiple reference pictures are used, the multiple reference pictures can be from different temporal directions or the same temporal direction. The motion estimator (550) produces as side information motion data (552) such as MV data, merge mode index values and reference picture selection data. The side information including motion data (552) is provided to the header formatter/entropy coder (590) as well as the motion compensator (555).

The motion compensator (555) applies MV values to the reconstructed reference picture(s) from the decoded picture buffer (570). When the chroma data for a picture has the same resolution as the luma data (e.g. when the format is YUV 4:4:4 format or RGB 4:4:4 format), the MV value that is applied for a chroma block may be the same as the MV value applied for the luma block. On the other hand, when the chroma data for a picture has reduced resolution relative to the luma data (e.g. when the format is YUV 4:2:0 format or YUV 4:2:2 format), the MV value that is applied for a chroma block may be scaled down and possibly rounded to adjust for the difference in chroma resolution (e.g., for YUV 4:2:0 format, by dividing the vertical and horizontal components of the MV value by two and truncating or rounding them to integer values; for YUV 4:2:2 format, by dividing the horizontal component of the MV value by two and truncating or rounding it to an integer value). The motion compensator (555) produces motion-compensated predictions for the current picture.

In a separate path within the encoder (500), an intra-picture estimator (540) determines how to perform intra-picture prediction for blocks of sample values of a current picture of the input video signal (505). The current picture can be entirely or partially coded using intra-picture coding. Using values of a reconstruction (538) of the current picture, for intra spatial prediction, the intra-picture estimator (540) determines how to spatially predict sample values of a current block of the current picture from neighboring, previously reconstructed sample values of the current picture. Or, for intra BC prediction using BV values, the intra-picture estimator (540) estimates displacement of the sample values of the current block to different candidate regions within the current picture.

The intra-picture estimator (540) produces as side information intra prediction data (542), such as information indicating whether intra prediction uses spatial prediction or intra BC prediction (e.g., a flag value per intra block), prediction mode direction (for intra spatial prediction), and BV values (for intra BC prediction). The intra prediction data (542) is provided to the header formatter/entropy coder (590) as well as the intra-picture predictor (545).

According to the intra prediction data (542), the intra-picture predictor (545) spatially predicts sample values of a current block of the current picture from neighboring, previously reconstructed sample values of the current picture. Or, for intra BC prediction, the intra-picture predictor (545) predicts the sample values of the current block using previously reconstructed sample values of an intra-prediction region, which is indicated by a BV value for the current block.

The intra/inter switch selects values of a motion-compensated prediction or intra-picture prediction for use as the prediction (558) for a given block. The difference (if any) between a block of the prediction (558) and a corresponding part of the original current picture of the input video signal (505) provides values of the residual (518). During reconstruction of the current picture, reconstructed residual values are combined with the prediction (558) to produce a reconstruction (538) of the original content from the video signal (505). In lossy compression, however, some information is still lost from the video signal (505).

In the transformer/scaler/quantizer (530), a frequency transformer converts spatial-domain video data into frequency-domain (i.e., spectral, transform) data. For block-based video coding, the frequency transformer applies a discrete cosine transform ("DCT"), an integer approximation thereof, or another type of forward block transform (e.g., a discrete sine transform or an integer approximation thereof) to blocks of prediction residual data (or sample value data if the prediction (558) is null), producing blocks of frequency transform coefficients. The encoder (500) may also be able to indicate that such transform step is skipped. The scaler/quantizer scales and quantizes the transform coefficients. For example, the quantizer applies dead-zone scalar quantization to the frequency-domain data with a quantization step size that varies on a frame-by-frame basis, tile-by-tile basis, slice-by-slice basis, block-by-block basis, frequency-specific basis or other basis. The quantized transform coefficient data (532) is provided to the header formatter/entropy coder (590).

In the scaler/inverse transformer (535), a scaler/inverse quantizer performs inverse scaling and inverse quantization on the quantized transform coefficients. An inverse frequency transformer performs an inverse frequency transform, producing blocks of reconstructed prediction residual values or sample values. The encoder (500) combines reconstructed residual values with values of the prediction (558) (e.g., motion-compensated prediction values, intra-picture prediction values) to form the reconstruction (538).

For intra-picture prediction, the values of the reconstruction (538) can be fed back to the intra-picture estimator (540) and intra-picture predictor (545). Also, the values of the reconstruction (538) can be used for motion-compensated prediction of subsequent pictures. The values of the reconstruction (538) can be further filtered. A filtering control (560) determines how to perform deblock filtering and SAO filtering on values of the reconstruction (538), for a given picture of the video signal (505). The filtering control (560) produces filter control data (562), which is provided to the header formatter/entropy coder (590) and merger/filter(s) (565).

In the merger/filter(s) (565), the encoder (500) merges content from different tiles into a reconstructed version of the picture. The encoder (500) selectively performs deblock filtering and SAO filtering according to the filter control data (562), so as to adaptively smooth discontinuities across boundaries in the frames. Other filtering (such as de-ringing filtering or ALF; not shown) can alternatively or additionally be applied. Tile boundaries can be selectively filtered or not filtered at all, depending on settings of the encoder (500), and the encoder (500) may provide syntax within the coded bitstream to indicate whether or not such filtering was applied. The decoded picture buffer (570) buffers the reconstructed current picture for use in subsequent motion-compensated prediction.

The header formatter/entropy coder (590) formats and/or entropy codes the general control data (522), quantized transform coefficient data (532), intra prediction data (542), motion data (552) and filter control data (562). MV values can be predictively coded. For example, the header formatter/entropy coder (590) uses Exponential-Golomb coding for entropy coding of various syntax elements such as syntax elements for differential MV values, after MV prediction.

The header formatter/entropy coder (590) provides the encoded data in the coded video bitstream (595). The format of the coded video bitstream (595) can be a variation or extension of HEVC format, Windows Media Video format, VC-1 format, MPEG-x format (e.g., MPEG-1, MPEG-2, or MPEG-4), H.26x format (e.g., H.261, H.262, H.263, H.264), or another format.

Depending on implementation and the type of compression desired, modules of the encoder can be added, omitted, split into multiple modules, combined with other modules, and/or replaced with like modules. In alternative embodiments, encoders with different modules and/or other configurations of modules perform one or more of the described techniques. Specific embodiments of encoders typically use a variation or supplemented version of the encoder (500). The relationships shown between modules within the encoder (500) indicate general flows of information in the encoder; other relationships are not shown for the sake of simplicity.

VI. Example Video Decoders

Figure 6:
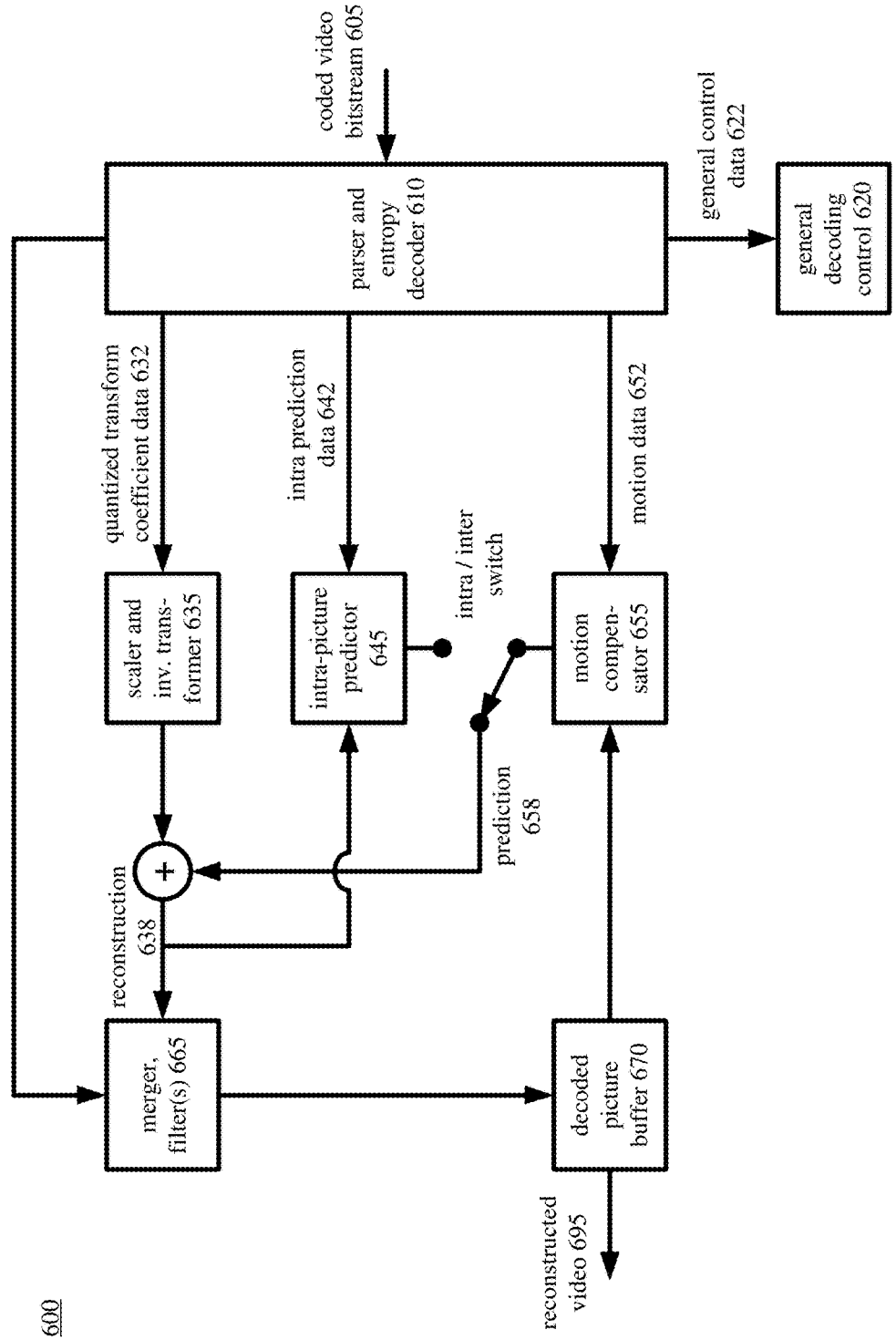
FIG. 6 is a diagram illustrating an example video decoder in conjunction with which some described embodiments can be implemented.

FIG. 6 is a block diagram of a generalized decoder (600) in conjunction with which some described embodiments can be implemented. The decoder (600) receives encoded data in a coded video bitstream (605) and produces output including pictures for reconstructed video (695). The format of the coded video bitstream (605) can be a variation or extension of HEVC format, Windows Media Video format, VC-1 format, MPEG-x format (e.g., MPEG-1, MPEG-2, or MPEG-4), H.26x format (e.g., H.261, H.262, H.263, H.264), or another format.

The decoder (600) is block-based and uses a block format that depends on implementation. Blocks may be further sub-divided at different stages. For example, a picture can be divided into 64×64 blocks, 32×32 blocks or 16×16 blocks, which can in turn be divided into smaller blocks of sample values. In implementations of decoding for the HEVC standard, a picture is partitioned into CTUs (CTBs), CUs (CBs), PUs (PBs) and TU (TBs).

The decoder (600) decompresses pictures using intra-picture decoding and/or inter-picture decoding. Many of the components of the decoder (600) are used for both intra-picture decoding and inter-picture decoding. The exact operations performed by those components can vary depending on the type of information being decompressed.

A buffer receives encoded data in the coded video bitstream (605) and makes the received encoded data available to the parser/entropy decoder (610). The parser/entropy decoder (610) entropy decodes entropy-coded data, typically applying the inverse of entropy coding performed in the encoder (500) (e.g., context-adaptive binary arithmetic decoding). As a result of parsing and entropy decoding, the parser/entropy decoder (610) produces general control data (622), quantized transform coefficient data (632), intra prediction data (642), motion data (652) and filter control data (662). In particular, for the motion data (652), the parser/entropy decoder (610) can entropy decode syntax elements for differential MV values, e.g., using context-adaptive binary arithmetic decoding, then combine the differential MV values with predicted MV values.

The general decoding control (620) receives the general control data (622) and provides control signals (not shown) to other modules (such as the scaler/inverse transformer (635), intra-picture predictor (645), motion compensator (655) and intra/inter switch) to set and change decoding parameters during decoding.

If the current picture is predicted using inter-picture prediction, a motion compensator (655) receives the motion data (652), such as MV data, reference picture selection data and merge mode index values. The motion compensator (655) applies MVs to the reconstructed reference picture(s) from the decoded picture buffer (670). The motion compensator (655) produces motion-compensated predictions for inter-coded blocks of the current picture. The decoded picture buffer (670) stores one or more previously reconstructed pictures for use as reference pictures.

In a separate path within the decoder (600), the intra-frame prediction predictor (645) receives the intra prediction data (642), such as information indicating whether intra prediction uses spatial prediction or intra BC prediction (e.g., a flag value per intra block), prediction mode direction (for intra spatial prediction) and BV values (for intra BC prediction). For intra spatial prediction, using values of a reconstruction (638) of the current picture, according to prediction mode data, the intra-picture predictor (645) spatially predicts sample values of a current block of the current picture from neighboring, previously reconstructed sample values of the current picture. Or, for intra BC prediction using BV values, the intra-picture predictor (645) predicts the sample values of the current block using previously reconstructed sample values of an intra-prediction region, which is indicated by a BV value for the current block.

The intra/inter switch selects values of a motion-compensated prediction or intra-picture prediction for use as the prediction (658) for a given block. For example, when HEVC syntax is followed, the intra/inter switch can be controlled based on a syntax element encoded for a CU of a picture that can contain intra-predicted CUs and inter-predicted CUs. The decoder (600) combines the prediction (658) with reconstructed residual values to produce the reconstruction (638) of the content from the video signal.

To reconstruct the residual, the scaler/inverse transformer (635) receives and processes the quantized transform coefficient data (632). In the scaler/inverse transformer (635), a scaler/inverse quantizer performs inverse scaling and inverse quantization on the quantized transform coefficients. An inverse frequency transformer performs an inverse frequency transform, producing blocks of reconstructed prediction residual values or sample values. For example, the inverse frequency transformer applies an inverse block transform to frequency transform coefficients, producing sample value data or prediction residual data. The inverse frequency transform can be an inverse DCT, an integer approximation thereof, or another type of inverse frequency transform (e.g., an inverse discrete sine transform or an integer approximation thereof).

For intra-picture prediction, the values of the reconstruction (638) can be fed back to the intra-picture predictor (645). For inter-picture prediction, the values of the reconstruction (638) can be further filtered. In the merger/filter(s) (665), the decoder (600) merges content from different tiles into a reconstructed version of the picture. The decoder (600) selectively performs deblock filtering and SAO filtering according to the filter control data (662) and rules for filter adaptation, so as to adaptively smooth discontinuities across boundaries in the frames. Other filtering (such as de-ringing filtering or ALF; not shown) can alternatively or additionally be applied. Tile boundaries can be selectively filtered or not filtered at all, depending on settings of the decoder (600) or a syntax indication within the encoded bitstream data. The decoded picture buffer (670) buffers the reconstructed current picture for use in subsequent motion-compensated prediction.

The decoder (600) can also include a post-processing filter. The post-processing filter can include de-ringing filtering, adaptive Wiener filtering, film-grain reproduction filtering, SAO filtering or another kind of filtering.

Depending on the implementation and the type of decompression desired, modules of the decoder can be added, omitted, split into multiple modules, combined with other modules, and/or replaced with like modules. In alternative embodiments, decoders with different modules and/or other configurations of modules perform one or more of the described techniques. Specific embodiments of decoders typically use a variation or supplemented version of the decoder (600). The relationships shown between modules within the decoder (600) indicate general flows of information in the decoder; other relationships are not shown for the sake of simplicity.

VII. Computationally Efficient Motion Estimation Techniques

This section presents various approaches to performing motion estimation during the encoding of video media data. These approaches facilitate encoding operations with improved computational efficiency, faster speeds, reduced power, and/or reduced memory usage and demand. The approaches described herein for performing motion estimation can be applied when encoding any type of video. In particular, however, performing motion estimation as described herein can improve performance when encoding video content where significant portions of the video frame are inactive (or stationary), thus creating opportunities for using less-precise interpolation schemes without any significant increase in distortion. Such techniques can be effectively used, for example, in video conference applications where only a portion of the video frame comprises an active (or moving) speaker or conference participant.

Figure 7:
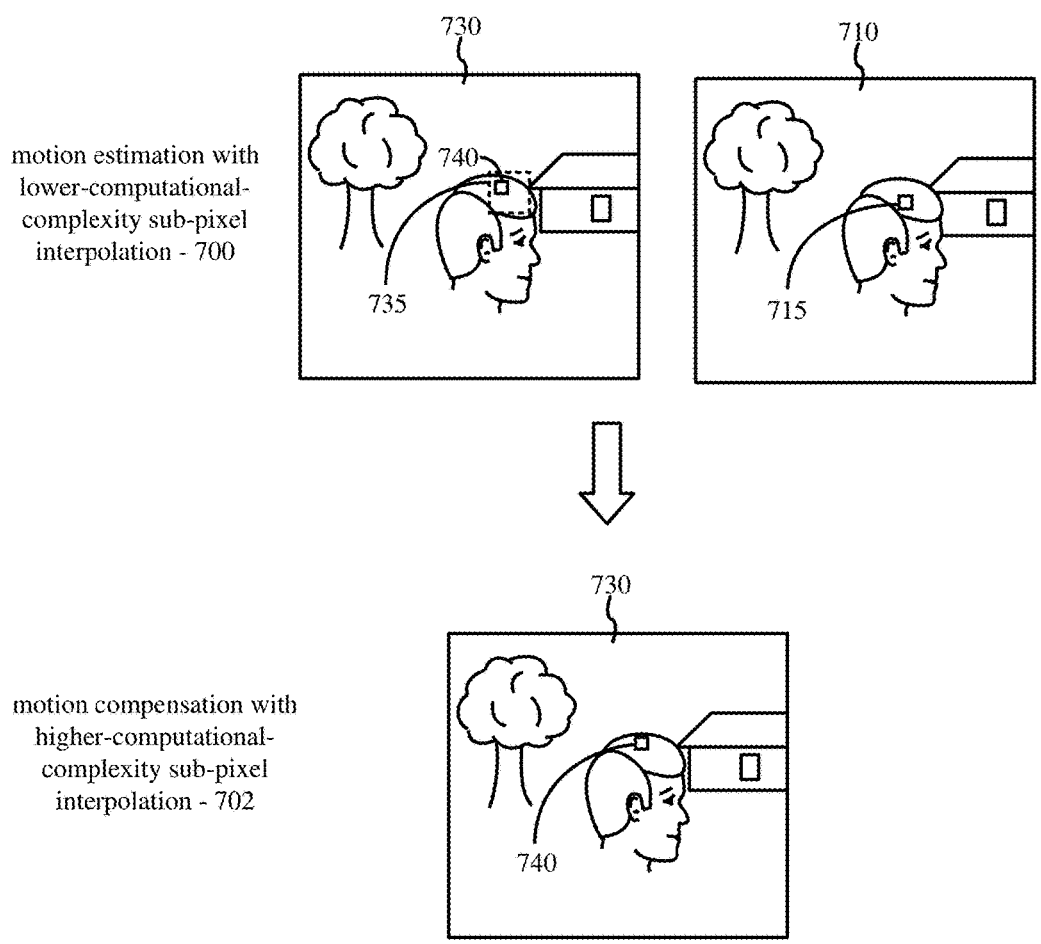
FIG. 7 is diagram illustrating an example motion estimation process in accordance with some of the described embodiments.

A. Using Computationally Efficient Sub-Pixel Interpolation Schemes for Motion Estimation Relative to Motion Compensation FIG. 7 illustrates an exemplary approach to motion estimation and motion compensation according to an embodiment of the disclosed technology. Before discussing the disclosed technology in detail, the general motion estimation process (700) and motion compensation process (702) will be described.

In FIG. 7, motion estimation (700) is illustrated for part of a predicted frame in an example encoder. For an 8×8 block of samples, 16×16 block, or other unit of the current picture being encoded (predicted frame (710)), the encoder finds a similar region in a reference frame (reference frame (730)) for use as a predictor (740). This predictor (or prediction region) may be selected from one of multiple candidate prediction regions, which are sometimes referred to as candidate blocks or candidate prediction reference regions.

In FIG. 7, the encoder searches in a search area (735) of a reference frame (730) for a suitable prediction region from among multiple candidate prediction regions. Various search strategies can be used to locate a suitable prediction region. For example, a hierarchical search can be performed in which multiple candidate prediction regions having a low resolution (e.g., integer pixel offset) are evaluated and a best candidate selected. Candidate prediction regions having a higher resolution (e.g., a half-pixel offset) that neighbor the selected candidate can then be evaluated and, if appropriate, a new best candidate can be selected. Candidate prediction regions having still higher resolution (e.g., quarter-pixel offset) can then be considered in a similar manner. Embodiments of the disclosed technology are not limited to any particular search strategy, and any suitable search pattern or strategy can be used. Further, for certain motion estimation schemes (including the HEVC standard), multiple reference frames exist in which the search is performed.

Within the search area (735), the encoder compares the block (715) from the predicted frame (710) to various candidate prediction regions in order to find a candidate prediction regions that is a good match. A variety of metrics can be used to select a prediction region for use from among the candidate prediction regions. For example, some encoders use a distortion metric during motion estimation to evaluate the quality and rate costs associated with using a candidate prediction region in a motion estimation choice. One common distortion metric is sum of absolute differences ("SAD"). To compute the SAD for a candidate prediction region in a reference picture frame, the encoder computes the sum of the absolute values of the residual between the current block and the candidate prediction regions, where the residual is the sample-by-sample difference between the current block and the candidate prediction region. The candidate prediction region with the minimum SAD can then be selected. Other distortion metrics that can be used include the sum of absolute Hadamard-transformed differences ("SAHD"), the sum of absolute transformed differences ("SATD"), sum of squared errors ("SSE"), mean squared error ("MSE"), and mean variance. Some encoders compute a rate-distortion cost as a distortion metric during motion estimation. Embodiments of the disclosed technology are not limited to any particular distortion metric, and any suitable metric can be used during motion estimation.

Based on the search strategy and distortion metric, the encoder selects one of the candidate prediction regions for use as the predictor region (740) for the block (715). The encoder outputs information specifying the MV to the selected prediction region (740) as well as any other necessary information to identify the prediction region (e.g., reference picture selection data (reference picture index) and merge mode index values).

As noted above, the candidate prediction regions computed and considered during motion estimation can include prediction regions that are at an integer offset or at a sub-pixel offset. For example, prediction regions at a sub-pixel offset include prediction regions offset by a sub-pixel interval in both the vertical and horizontal dimensions as well as prediction regions offset by a sub-pixel interval in only one of the vertical or horizontal dimensions (e.g., a prediction region with an integer vertical offset and sub-pixel horizontal offset, or a prediction region with a sub-pixel vertical offset and an integer horizontal offset).

Figure 8A:
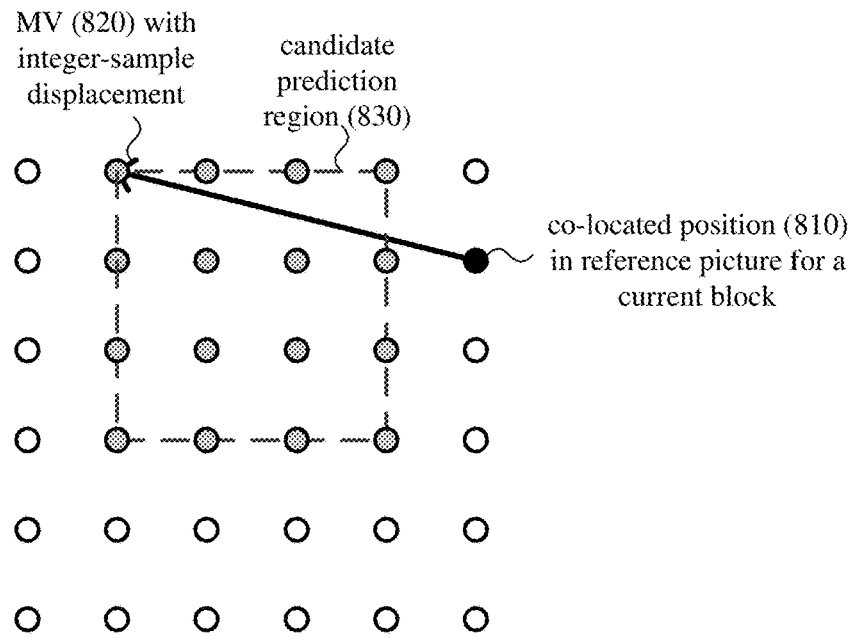
FIGS. 8a and 8b are diagrams illustrating a candidate prediction region at a sub-pixel offset as computed during motion estimation.
Figure 8B:
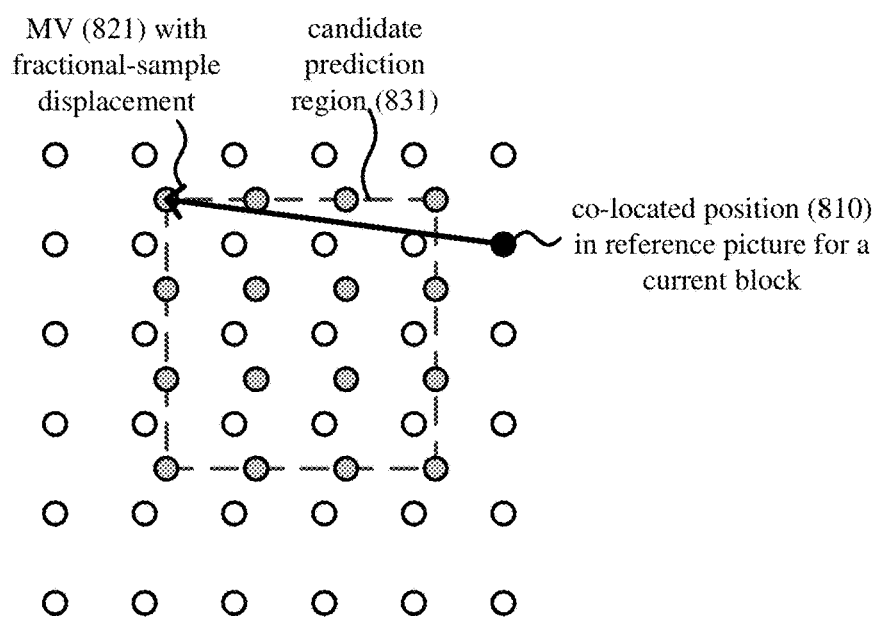

FIGS. 8a and 8b illustrate example integer-offset and sub-pixel-offset prediction regions. FIG. 8a is a schematic diagram (801) showing a candidate prediction region (830) having an integer-sample spatial displacement. The MV (820) for the candidate prediction region (830) indicates a spatial displacement of four samples to the left, and one sample up, relative to the co-located position (810) in a reference picture for a current block. For example, for a 4×4 current block at position (64, 96) in a current picture, the MV (820) indicates a 4×4 prediction region (830) whose position is (60, 95) in the reference picture. The prediction region (830) includes sample values at integer-sample positions in the reference picture. An encoder or decoder need not perform interpolation to determine the values of the prediction region (830).

FIG. 8b is a schematic diagram (802) showing a candidate prediction region (831) having a fractional-sample (sub-pixel) spatial displacement. The MV (821) for the candidate prediction region (831) indicates a spatial displacement of 3.75 samples to the left, and 0.5 samples up, relative to the co-located position (810) in a reference picture for a current block. For example, for a 4×4 current block at position (64, 96) in a current picture, the MV (821) indicates a 4×4 prediction region (831) whose position is (60.25, 95.5) in the reference picture. The prediction region (831) includes interpolated sample values at fractional-sample positions in the reference picture. An encoder or decoder performs interpolation to determine the sample values of the prediction region (831). Such interpolation for prediction regions at fractional-sample positions is also referred to herein as "sub-pixel interpolation". By using fractional-sample spatial displacements, more candidate prediction regions that may match a current block can be considered and used during the video encoding process. As a result, the quality of motion-compensated prediction improves, especially for video content with many active, moving objects (e.g., natural video).

Sub-pixel interpolation is typically performed using an interpolation filter that computes the interpolated value at the fractional-sample position from known or previously computed neighboring values. The neighboring values can be the original integer values from the reference frame, or can themselves be interpolated values from previous sub-pixel interpolation processes. For instance, half-pixel values may be computed by an interpolation filter using integer pixel values, and quarter-pixel values may be computed by an interpolation filter from the half-pixel values, the integers values, or combinations thereof. The number of neighboring values used by an interpolation filter generally corresponds to the number of "taps" the interpolation filter is said to have. Interpolation filters vary in the number of taps they use. Generally speaking, using an interpolation filter with higher numbers of taps increases the precision with which the interpolation value is computed. Accordingly, many video codec standards specify interpolation filters with high numbers of taps (six or more taps) for use during motion compensation.

Further, during motion estimation, a pre-interpolation step is commonly performed in which sub-pixel values in a frame are pre-interpolated before any searches for suitable prediction regions proceed. For example, in some embodiments, all sub-pixel values at a half-pixel-offset and at a quarter-pixel-offset can be pre-interpolated in a reference frame prior to motion estimation perform. Pre-interpolation typically results in additional reference frames of sub-pixel values being generated, one for each available sub-pixel offset. For instance, when quarter-pixel resolution is possible, fifteen additional reference frames can be generated.

Returning to FIG. 7, after motion estimation (700), motion compensation (702) is performed. During motion compensation (702), a motion compensator applies the specified MV value to the reference frame (730) to determine motion-compensated prediction values (e.g., for inter-frame prediction). To compute motion-compensated prediction values for a prediction region that is at a sub-pixel offset, the motion compensator also performs sub-pixel interpolation. The encoder then computes the sample-by-sample difference between the current unit and its motion-compensated prediction to determine a residual (also called error signal). The residual is frequency transformed, quantized, and entropy encoded. The overall bit rate of a predicted picture depends in large part on the bit rate of residuals. The bit rate of residuals is low if the residuals are simple (due to motion estimation that finds exact or good matches) or lossy compression drastically reduces the complexity of the residuals. Bits saved with successful motion estimation can be used to improve quality elsewhere or reduce overall bit rate. On the other hand, the bit rate of complex residuals can be higher, depending on the degree of lossy compression applied to reduce the complexity of the residuals.

If a predicted picture is used as a reference picture for subsequent motion compensation, the encoder reconstructs the predicted picture. When reconstructing residuals, the encoder reconstructs transform coefficients that were quantized using inverse quantization and performs an inverse frequency transform. The encoder performs motion compensation to compute the motion-compensated predictors, and combines the predictors with the reconstructed residuals.

Because the results of motion compensation (such as motion compensation (702)) are used to determine a residual, which is then encoded into the bit stream, the interpolation filters used during motion compensation (including sub-pixel interpolation filters) are typically specified by a video codec standard and designated as normative requirements. By specifying the sub-pixel interpolation filters as normative requirements, the encoded residuals created during motion compensation on the encoder-side can be appropriately decoded on the decoder-side such that the reconstructed image is accurately reproduced.

Encoders typically spend a large proportion of encoding time performing motion estimation, attempting to find good matches, and thereby improve rate-distortion performance. With newer standards using increasingly complex sub-pixel interpolation filters, the computational complexity and memory requirements for motion estimation are ever increasing. For example, for motion compensation according to the H.264/AVC standard, sub-pixels at half-pixel-offset positions are interpolated from integer pixels using a 6-tap filter, and sub-pixels at quarter-pixel-offset positions are interpolated from the sub-pixels at half position using a linear 2-tap filter. For motion compensation according to the HEVC standard, all sub-pixels are interpolated using a 7-tap or 8-tap filter. When used during motion estimation, such high-tap, computationally complex filters consume large amounts of processing resources, memory, and time during encoding. Additionally, when pre-interpolation of sub-pixel values in reference frames is performed, these burdens can be magnified and made constant. These burdens are further compounded for standards in which multiple reference frames are available for use during motion estimation (such as the HEVC standard), thus requiring still further pre-interpolation.

It has been observed that when searching for candidate prediction regions, the distortion created by a candidate prediction regions can be estimated accurately using lower complexity sub-pixel interpolation schemes than used during motion compensation. This creates the opportunity to decrease the computational complexity (among other benefits) in motion estimation by: (a) "de-coupling" the sub-pixel interpolation filters used during motion estimation from motion compensation and using simpler sub-pixel interpolation filters having lower computational complexity during motion estimation; and/or (b) reducing (or, in some cases, eliminating) pre-interpolation of sub-pixel values. Although the lower complexity sub-pixel interpolation used for motion estimation may, in some instance, select a different prediction region than when using sub-pixel interpolation filters used during motion compensation, the lower-complexity scheme can be configured, and in some cases adaptively selected, to create acceptable results.

FIG. 7 illustrates a motion estimation process (700) and a motion compensation process (702) according to a general embodiment of the disclosed technology where the motion estimation process is performed using sub-pixel interpolation computations that are computationally less complex than the sub-pixel interpolation computations that are performed during motion compensation. Such an approach has many benefits and desirable effects, any one or more of which can be realized in implementations of the disclosed technology. For example, the computational burden experienced by the motion estimator can be reduced, the speed with which motion estimation can be performed can be increased, the memory usage and size used during motion estimation can be reduced, and/or the power used by the motion estimator can be reduced. Such benefits and effects can be especially desirable for applications in which fast, substantially real-time, encoding is desired. Such applications include, for example, video conferencing and video encoding of live events.

In FIG. 7, and by way of example, motion compensation (702) can be understood to be performed using sub-pixel interpolation filters specified in the HEVC standard. Specifically, the normative seven- and eight-tap sub-pixel interpolation filters specified at Section 8.5.3.3.3.2 of the HEVC standard (Recommendation ITU-T H.265) are understood to be used during motion compensation, though other standardized sub-pixel interpolation filters could be used during motion compensation. Additional details concerning the seven- and eight-tap HEVC sub-pixel interpolation filters are discussed below in Section VII.D.

Further, it is to be understood that the disclosed technology is being described as being applied to the interpolation of luminance values unless otherwise indicated. Any one or more of the disclosed embodiments can be adapted for use with chrominance value sub-pixel interpolation as well.

To realize one or more of the desirable benefits and effects of the disclosed technology, a variety of lower-complexity interpolation schemes can be used during motion estimation (700). In general, a lower-complexity interpolation scheme can use a simpler sub-pixel interpolation filter having a fewer numbers of taps to interpolate the sub-pixels than in the sub-pixel interpolation filter used during motion compensation. Thus, in certain embodiments of the disclosed technology, instead of using the sub-pixel interpolation filters specified by a particular standard (e.g., the HEVC standard), the encoder can use a simpler filter with fewer number of taps to approximate the sub-pixel values. On account of the reduced computational complexity, the resulting filter is also faster when computing the approximate values of sub-pixels as the encoder searches for the most similar block in the reference frames (e.g., in one or more previous frames). Generally speaking, the closer the interpolated sub-pixel values obtained using the simpler filter are to the interpolated sub-pixel values using the higher-complexity filter (e.g., the sub-pixel interpolation filter specified by the HEVC standard), the more likely the encoder will get the same block using the simpler filters.

In one particular embodiment of the disclosed technology, a two-step filter for sub-pixel interpolation is used during motion estimation. Such a two-step filter can be used, for example, as part of an encoder for a video codec standard having a higher complexity sub-pixel interpolation filter for motion compensation (e.g., an HEVC encoder). More specifically, for the sub-pixels at half positions, the 7-tap or 8-tap filters specified in the HEVC standard can be used.

Further, in certain implementations, those sub-pixels at a half-pixel offset are pre-interpolated before motion estimation. For the sub-pixels at quarter positions, however, a 2-tap linear filter to interpolate from neighboring pixels at integer or half positions is used. Further, in this embodiment, interpolation of sub-pixels at quarter-pixel-offset positions is performed only when the encoder performs a motion search to refine the motion vector from pixels at half positions to pixels at quarter positions. In other words, in this embodiment, sub-pixel values at half-pixel offsets are pre-interpolated whereas sub-pixel values at quarter-pixel offsets are not pre-interpolated; instead, interpolation of quarter-pixel values is performed "on the fly" as needed during the search for a suitable prediction region.

The computational savings that can be gained by omitting at least some pre-interpolation of sub-pixel values can be significant. For example, if the encoder pre-interpolates all the half-pixel-offset and quarter-pixel-offset sub-pixels using the sub-pixel interpolation filter specified by the HEVC standard, the encoder pre-computes (pre-interpolates) the values of sub-pixels for as many as 15 times the number of pixels at integer positions. If the encoder interpolates sub-pixels using the two-step filter as described in this embodiment, the encoder pre-computes (pre-interpolates) the values of half-pixel-offset sub-pixels only, and thus pre-interpolation for only as many as 3 times the number of integer pixels. This alone reduces the computational complexity associated with motion estimation. Still further, the computational complexity of interpolating sub-pixels using the 2-tap linear filter at quarter positions is also much less. Roughly speaking, the two-step filter can save the time for sub-pixels interpolation as much as 80%. Further, it has been observed that this embodiment almost always results in selection of the same candidate prediction region as when using the HEVC sub-pixel interpolation filter. For instance, the observed loss was at most 0.1 dB in terms of PSNR.

In another embodiment of the disclosed technology, no pre-interpolation is performed during motion estimation and sub-pixel interpolation filters having lower complexity than the motion compensation sub-pixel interpolation filters are used during motion estimation. For instance, in one particular implementation, sub-pixel values at half-pixel offsets with no quarter-pixel offsets (half-pixel vertical and integer-pixel horizontal, half-pixel horizontal and integer-pixel vertical, or half-pixel vertical and half-pixel horizontal) are computed without pre-interpolation with a linear filter (two-tap filter) that computes the average between two integer pixels; sub-pixel values at quarter-pixel offsets with no half-pixel offsets (quarter-pixel vertical and integer-pixel horizontal, quarter-pixel horizontal and integer-pixel vertical, and quarter-pixel horizontal and quarter-pixel vertical) are computed without pre-interpolation with a weighted linear filter (two-tap filter) applied to two neighboring integer pixels and weighted 3:1 toward the closest integer pixel; and sub-pixel values at combination quarter-pixel and half-pixel offsets (quarter-pixel vertical and half-pixel horizontal, and quarter-pixel horizontal and half-pixel vertical) are computed using a linear filter that computes the average between two neighboring sub-pixel values (the two closest neighboring quarter-pixel horizontal and quarter-pixel vertical sub-pixel values), which are now available. Thus, in this implementation, two-tap filters are used throughout, greatly increasing the speed and resource usage during motion estimation. Still further, another advantage that can be realized by such embodiments is that SIMD technology (single instruction, multiple data technology) can be used to perform at least some of these computations in parallel with one another using the available SIMD instructions of a particular processor. Still further, when this sub-pixel interpolation scheme is performed using SIMD technology, the number of registers used can be reduced.

Figure 15A:
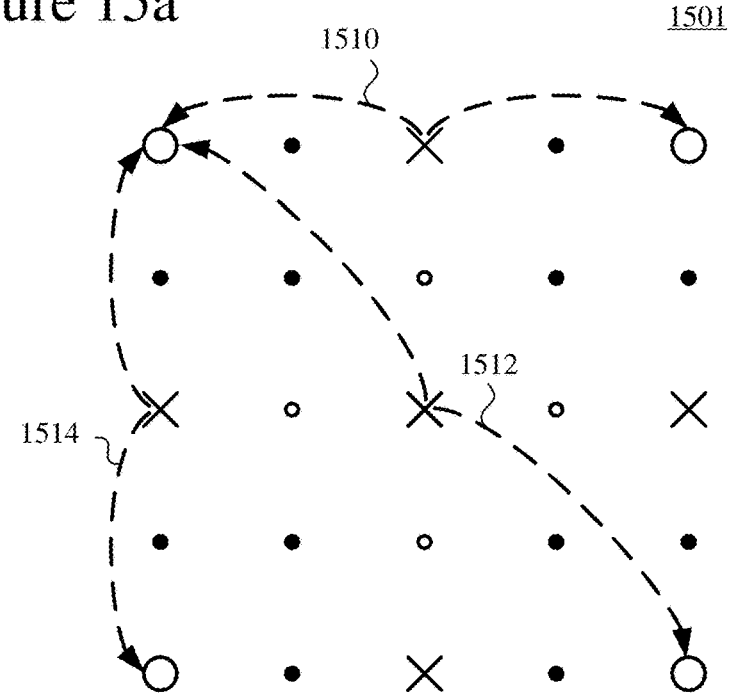
FIGS. 15a-15c are schematic block diagrams illustrating an example sub-pixel interpolation scheme.
Figure 15B:
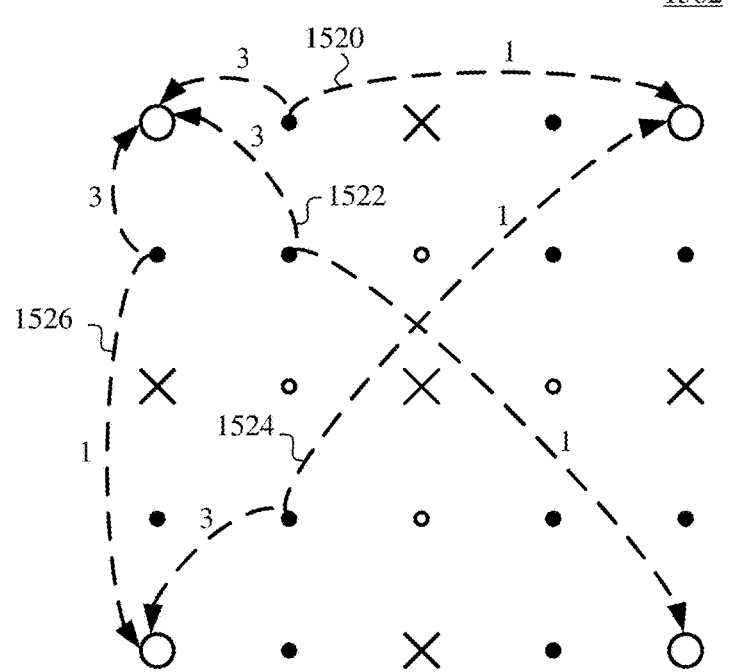
Figure 15C:
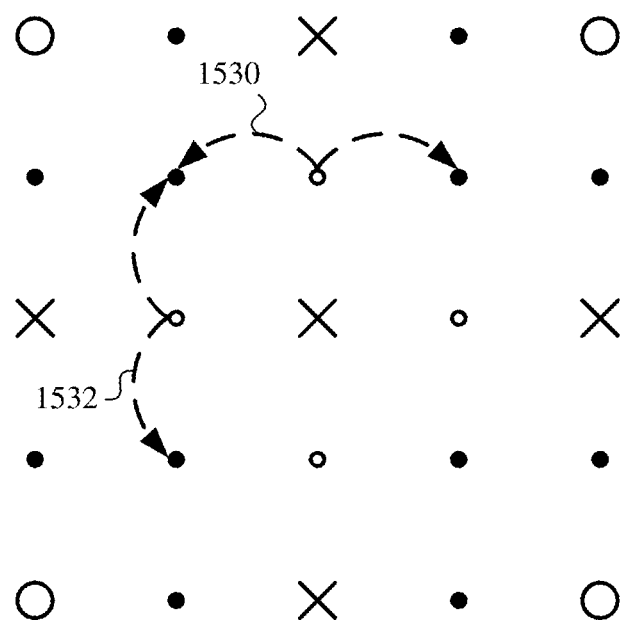

FIGS. 15a-c are schematic block diagrams (1500), (1501), (1502) illustrating this example sub-pixel interpolation scheme. In particular, FIGS. 15a-c show four integer pixels (shown as large hollow circles), sub-pixel positions at half-pixel offsets with no quarter-pixel offsets (shown as crosses), sub-pixel positions at quarter-pixel offsets with no half-pixel offsets (shown as smaller solid circles), and sub-pixel positions at combination quarter-pixel and half-pixel offsets (shown as smaller hollow circles). As explained in the previous paragraph, in this example, sub-pixel values at half-pixel offsets with no quarter-pixel offsets are computed without pre-interpolation with a linear filter (two-tap filter) that computes the average between two integer pixels. FIG. 15a illustrates this procedure by schematically illustrating the application of three linear filters (1510), (1512), (1514) to determine the sub-pixel value at three of the five relevant sub-pixel positions. Sub-pixel values at quarter-pixel offsets with no half-pixel offsets are computed without pre-interpolation with a 3:1 weighted linear filter applied to two neighboring integer pixels. FIG. 15b illustrates this procedure by schematically illustrating the application of four 3:1 weighted linear filters (1520), (1522), (1524), (1526) to determine the sub-pixel value at four of the twelve relevant sub-pixel positions. The weights "3" and "1" are shown to illustrate which integer values receive the respective weight. Finally, sub-pixel values at combination quarter-pixel and half-pixel offsets are computed using a linear filter that computes the average between two, now-available, neighboring sub-pixel values. FIG. 15c illustrates this procedure by schematically illustrating the application of two linear filters (1530), (1532) to determine the sub-pixel value at two of the four relevant sub-pixel positions. As can be seen, the linear filters (1530), (1532) interpolate the sub-pixel values at the combination quarter-pixel and half-pixel offsets from neighboring sub-pixel values at a quarter-pixel horizontal and quarter-pixel vertical offset. These values were computed during the procedure illustrated by FIG. 15b and are now available for use by the fast, two-tap linear filter of FIG. 15c.

In an alternative embodiment, the sub-pixel interpolation proceeds as described in the previous paragraphs, but the sub-pixel values at combination quarter-pixel and half-pixel offsets (quarter-pixel vertical and half-pixel horizontal, and quarter-pixel horizontal and half-pixel vertical) are computed weighted bilinear filter (four-tap filter) applied to four integer pixels and weighted 3:1 toward the closest integer pixels. Thus, a combination of two-tap and four-tap filters is used.

Figure 9:
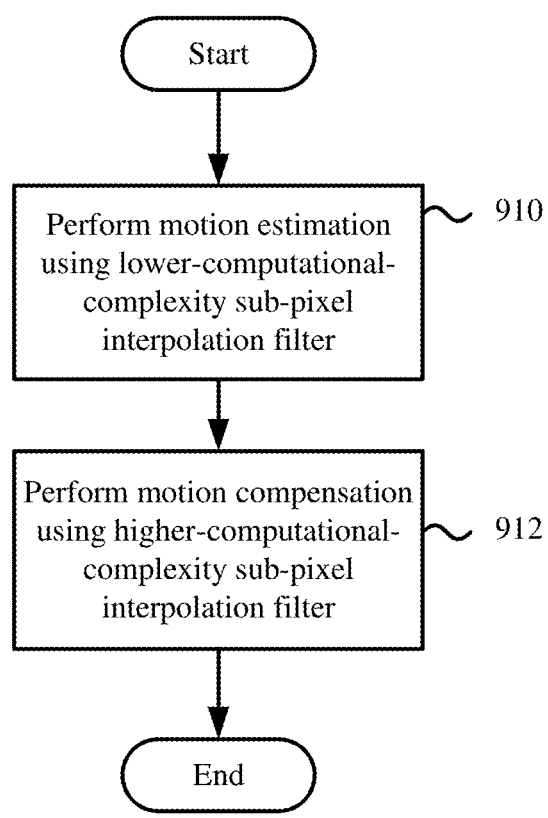
FIG. 9 is a flow chart showing an example embodiment for implementing an encoding technique according to the disclosed technology.

FIG. 9 is a flow chart (900) showing an example embodiment for implementing an encoding technique according to the disclosed technology. The particular operations or sequence of operations should not be construed as limiting, as they can be performed alone or in any combination or subcombination with one another. Additionally, the illustrated operations can be performed together with one or more other operations. Still further, the identified operations need not be performed by a single software module, but can be implemented using multiple modules or software tools. The method acts illustrated in flowchart (900) are performed during encoding of a frame of digital video media and are typically performed by a video encoder.

At (910), motion estimation is performed using a first sub-pixel interpolation filter configured to compute sub-pixel values for two or more candidate prediction regions at a sub-pixel offset, the two or more candidate prediction regions being located in one or more reference frames.

At (912), for at least a selected one of the candidate prediction regions at the sub-pixel offset, motion compensation is performed using a second interpolation filter.

In the illustrated embodiment, the first sub-pixel interpolation filter used during motion estimation has a lower computational complexity than the second sub-pixel interpolation filter used during motion compensation. In particular implementation, the computational complexity of the integer pixel interpolation filter can be the same between motion estimation and motion compensation.

The reduced computational complexity during motion estimation can be realized in part by controlling how pre-interpolation of sub-pixel values in the one or more reference frames is performed. For instance, in one example implementation, pre-interpolation of sub-pixel values is omitted in the one or more reference frames (no pre-interpolation is performed for any sub-pixel values). In other implementations, pre-interpolation may be omitted for some but not all sub-pixel values. For instance, in one example implementation, pre-interpolation during motion estimation is performed for one or more reference frames for a first set of sub-pixel values but not performed for the one or more reference frames for a second set of sub-pixel values. In this implementation, the first set of sub-pixel values has a lower resolution than the second set of sub-pixel values. For example, the first set of sub-pixel values can be sub-pixel values at a half-pixel offset whereas the second set of sub-pixel values can be sub-pixel values at a quarter-pixel offset. Further, in this embodiment, the first and second sets of sub-pixel values are sub-pixel values that are actually available and supported for motion estimation (not unsupported sub-pixel values that would never be used during motion estimation). In one further example of this implementation, motion estimation comprises pre-interpolating sub-pixel values at combinations of half-pixel-offset and integer-pixel-offset values but not pre-interpolating any sub-pixel values at quarter-pixel offsets. Other variations are also possible.

The reduced computational complexity during motion estimation in FIG. 9 can also be realized in part by reducing the number of taps in the sub-pixel interpolation filters used during motion estimation. For instance, in one example implementation, two-tap sub-pixel interpolation filters are used for motion estimation whereas six-tap or seven-tap sub-pixel interpolation filters are used for motion compensation. Additional details concerning such an embodiment (using two-tap sub-pixel interpolation filters for motion estimation and normative seven- and eight-tap sub-pixel interpolation filters for motion compensation) are discussed below in Section VII.D.

The motion estimation technique illustrated in FIG. 9 as well as the other motion estimation embodiments disclosed herein not only apply to situations where a motion vector is computed from a single reference frame but also where a single motion vector is computed from multiple reference frames. For instance, any of the disclosed embodiment can also be used for B (bidirectional) frames in which a predicted block is predicted from two reference blocks, each from a different reference frame (e.g., an earlier frame in sequence and a later frame in sequence). In such cases, motion estimation proceeds as described herein but the prediction region can be computed as an average or a weighted average of the two prediction regions from the two different reference frames. Further, one or both of the reference frames can be pre-interpolated (or at least partially pre-interpolated), or pre-interpolation can be omitted for both reference frames.

As more fully explained in the next subsection, the first interpolation filter may be selected from among multiple available sub-pixel interpolation filters as part of an adaptive selection scheme. For instance, the first interpolation filter can be adaptively selected for use during motion estimation from among multiple available interpolation filters, each of the multiple available interpolation filters having a different computational complexity from one another. The adaptive selection can be based at least in part, for example, on a metric indicating a degree of object movement in the frame of the digital video media. One such metric that can be used is the skip block ratio from a previously encoded frame (the frame preceding in sequence the frame being currently encoded).

B. Adaptively Selecting Sub-Pixel Interpolation Schemes Used During Motion Estimation In some cases, the benefits of performing motion estimation with lower-complexity sub-pixel interpolation schemes are outweighed by the loss in quality. For instance, video frames that have a high degree of movement may suffer an unacceptable quality loss if embodiments of the lower-complexity motion estimation schemes are always used during encoding. Accordingly, this section presents various approaches to adaptively selecting a sub-pixel motion interpolation scheme for use in motion estimation. These approaches facilitate encoding operations with improved computational efficiency, faster speeds, reduced power, and/or reduced memory usage and demand. The approaches described herein for performing motion estimation can be applied when encoding any type of video. In particular, however, performing motion estimation as described herein can improve performance when encoding video content where, for at least some of the video frame being encoded, significant portions of the video frame are inactive (or stationary), thus creating opportunities for using less-precise interpolation schemes without any significant increase in distortion. Such techniques can be effectively used, for example, in video conference applications where only a portion of the video frame comprises an active (or moving) speaker or conference participant. The disclosed techniques also account for situations where the video content has frames that include significant movement.

Figure 10:
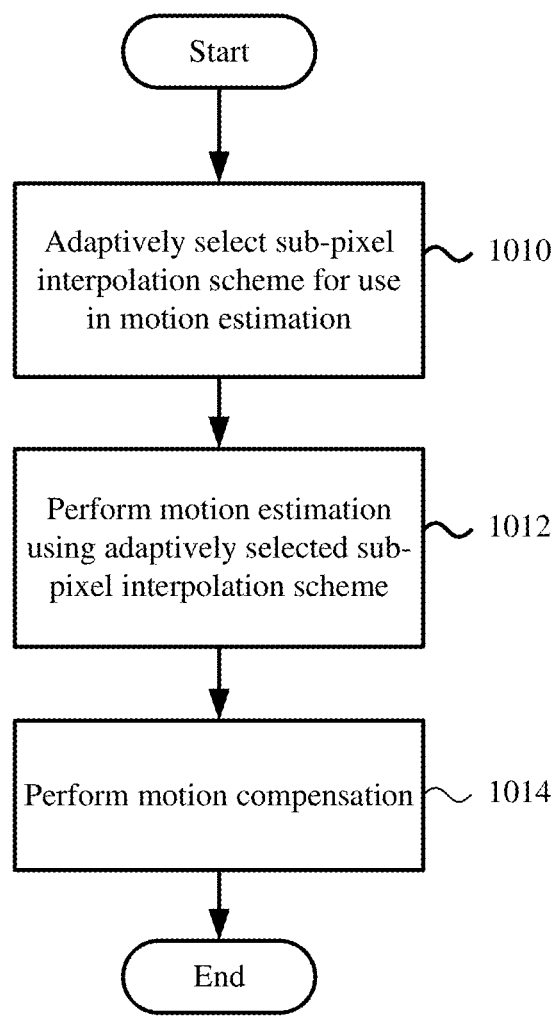
FIG. 10 is a flow chart showing an example embodiment for implementing an adaptive encoding technique according to the disclosed technology.

FIG. 10 is a flow chart (1000) showing an example embodiment for implementing an adaptive encoding technique according to the disclosed technology. The particular operations or sequence of operations should not be construed as limiting, as they can be performed alone or in any combination or subcombination with one another. Additionally, the illustrated operations can be performed together with one or more other operations. Still further, the identified operations need not be performed by a single software module, but can be implemented using multiple modules or software tools. The method acts illustrated in flowchart (1000) are performed during encoding of a frame of digital video media and are performed by a video encoder.

At (1010), one sub-pixel interpolation scheme from among multiple available sub-pixel interpolation schemes is adaptively selected for use during a motion estimation process for a block of video media data in a video frame.

At (1012), a motion estimation process is performed using the selected sub-pixel interpolation scheme. The motion estimation process comprises (a) computing multiple candidate prediction regions from one or more reference frames, the candidate prediction regions predicting motion of a block of video media data in a video frame being encoded, at least some of the candidate prediction regions being computed using the adaptively selected sub-pixel interpolation scheme, and (b) selecting one of the candidate prediction regions for the block of video media data from among the multiple candidate prediction regions. In the illustrated embodiment, the selected one of the candidate prediction regions is at a sub-pixel offset.

At (1014), a motion compensation process is performed. In the illustrated embodiment, motion compensation for the selected one of the candidate prediction regions is performed. The motion compensation process comprises computing the selected one of the candidate prediction regions using a second sub-pixel interpolation filer, the second sub-pixel interpolation filter having higher computational complexity than the first sub-pixel interpolation filter used during motion estimation.

The multiple available sub-pixel interpolation schemes for motion estimation can vary from one another in terms of the number of taps used in the sub-pixel interpolation filters and/or the amount of pre-interpolation of sub-pixel values that is performed. For instance, in one example embodiment, the multiple available sub-pixel interpolation schemes include a first sub-pixel interpolation scheme and a second sub-pixel interpolation scheme, and the first sub-pixel interpolation scheme uses a sub-pixel interpolation filter having a higher numbers of taps than any sub-pixel interpolation filter used in the second sub-pixel interpolation scheme. In a particular embodiment, the higher-complexity first sub-pixel interpolation scheme uses seven- or eight-tap sub-pixel interpolation filters (e.g., the HEVC sub-pixel interpolation filters discussed in Section VII.A or VII.D), and the lower-complexity second sub-pixel interpolation scheme uses two-tap sub-pixel interpolation filters (e.g., the two-tap filters discussed in Section VII.A or VII.D). In some embodiments, the first sub-pixel interpolation scheme pre-interpolates a higher number of sub-pixel values for a frame than the second sub-pixel interpolation scheme. For instance, the second sub-pixel interpolation scheme can omit pre-interpolation of any sub-pixel value from a reference frame for a frame being encoded, or perform pre-interpolation for specified sub-pixel values and omit pre-interpolation for other sub-pixel values (e.g., pre-interpolate sub-pixel values at half-pixel offsets, but omit pre-interpolation of sub-pixel values at quarter-pixel offsets). In such embodiments, the first sub-pixel interpolation scheme can pre-interpolate all sub-pixel values (e.g., all supported sub-pixel values, such as all the half-pixel-offset and quarter-pixel-offset sub-pixels) from the reference frame(s) for a frame being encoded.

The adaptive selection of a sub-pixel interpolation scheme for motion estimation can be performed using a variety of techniques. In one example embodiment, the adaptive selection is performed by computing a metric indicating a predicted degree of object movement in the video frame being encoded; comparing the metric to a threshold; and selecting one of the multiple available sub-pixel interpolation schemes based at least in part on the comparison. The metric used can vary, but in one implementation is a skip block ratio. The skip block ratio can be computed for a previously encoded frame (e.g., the immediately previous frame in sequence corresponding to the previous adjacent frame in the video sequence), for multiple previous encoded frames (e.g., two or more of the previous frames in sequence), or, in some cases, for the currently encoded frame if sufficient skip block information is available. In a particular implementation, the skip block ratio is the number of blocks in the adjacent previous frame that were encoded in a skip mode relative to a total number of blocks in the adjacent previous frame (or vice versa). Or, the skip block ratio can be the number of blocks in the adjacent previous frame that were encoded in a skip mode relative to the number of blocks in the adjacent previous that were not encoded in skip mode (or vice versa). A block may be identified as a skip block (e.g., through a suitable flag or other side information for the block) if it is determined during encoding (during motion estimation) that the block has not changed from the previous frame. This skip block information is useful, then, in determining the amount of data in a frame that changes from frame to frame and can serve as a useful predictor for the amount of movement to be expected in the frame currently being encoded since video frames in sequence are typically highly similar to one another. Certain video codec standards support skip block encoding, such as the HEVC standard, meaning that this skip block data will be available for use to compute the relevant metric for adaptively selecting a sub-pixel interpolation scheme for motion estimation was described herein.

Figure 11:
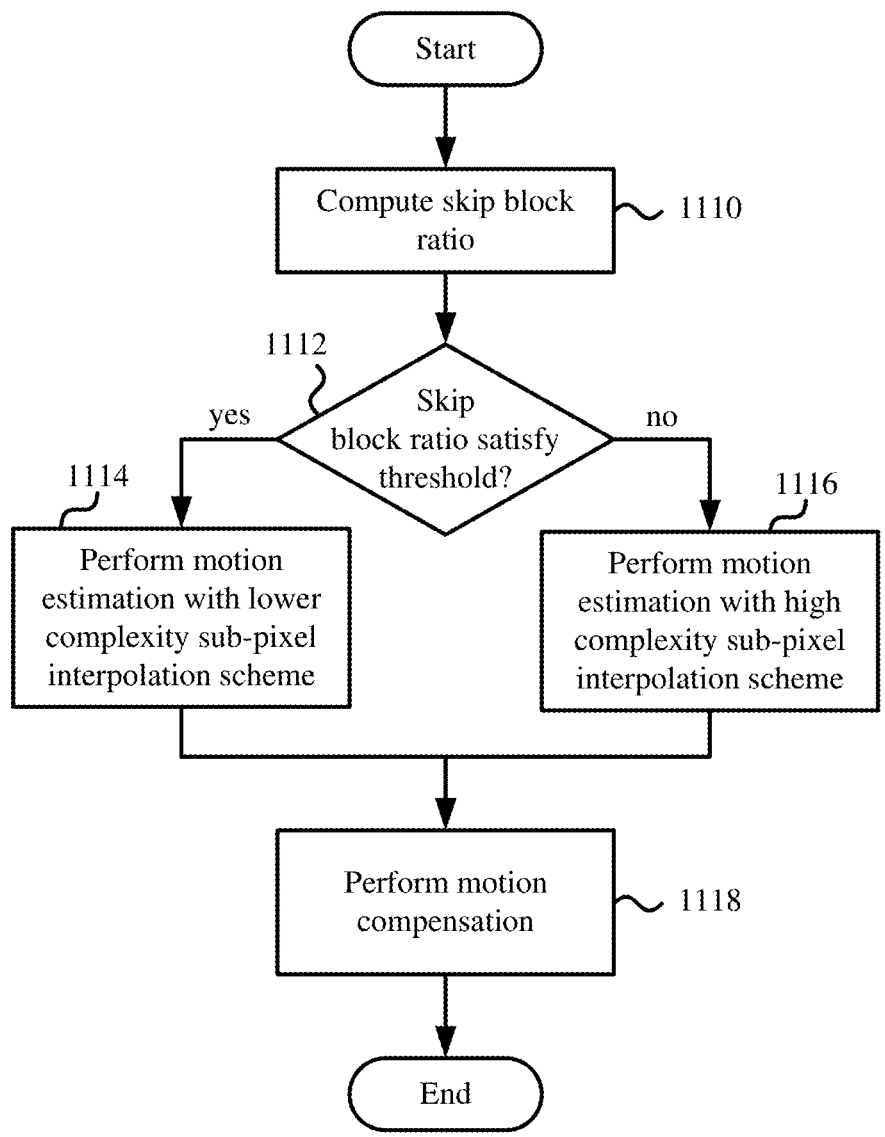
FIG. 11 is a flow chart of an example method for adaptively selecting a sub-pixel interpolation scheme.

FIG. 11 is a flow chart (1100) of an example method for adaptively selecting a sub-pixel interpolation scheme using the skip block ratio according to the disclosed technology. At (1110), the skip block ratio for the immediately previous frame in the video sequence. As noted, the skip block ratio can be the number of blocks in the adjacent previous frame that were encoded in a skip mode relative to a total number of blocks in the adjacent previous frame, or other such metric or equivalent. At (1112), a determination is made as to whether the skip block ratio satisfies the predetermined threshold. For instance, if the skip block ratio is the number of blocks in the adjacent previous frame that were encoded in a skip mode relative to a total number of blocks in the adjacent previous frame, then a determination can be made as to whether the skip block ratio meets and/or exceeds the threshold. The threshold can vary from implementation to implementation but generally identifies a point where the encoding time and resource-saving benefits of the lower-computational-complexity sub-pixel interpolation scheme exceed the risk in quality loss by using such schemes. The threshold will typically depend on the relative differences between the lower- and higher-complexity schemes, the capabilities of the encoding hardware supporting the encoder, and/or the desires of the encoder designer or user. If the skip block ratio satisfies the predetermined threshold, then, at (1114), motion estimation is performed using a lower complexity sub-pixel interpolation scheme as described herein; otherwise, motion estimation is performed using a higher complexity sub-pixel interpolation scheme as described herein (1116). At (1118), motion compensation is performed. For instance, motion compensation can be performed using sub-pixel interpolation filter specified by a relevant video codec standard (e.g., a normative sub-pixel interpolation filter, such as the sub-pixel interpolation filters defined by the HEVC standard and disclosed in detail in Section VII.D).

Other metrics aside from the skip block ratio can also be used to adaptively select a sub-pixel interpolation scheme for use during motion estimation. For example, an integer pixel filter ratio could be used, where the ratio indicates the number of times an inter-pixel-offset prediction region was selected and an integer pixel filter used during motion compensation relative to the total number of prediction regions for an immediately adjacent previous frame in the video sequence. Further, information about the video source that is available to the encoder could be used. For instance, if the encoder is encoding screen information (e.g., a video of a computer screen), then a lower-computationally-complex sub-pixel interpolation scheme can be employed since screen information typically comprises large regions that do not change, as opposed to natural video where movement is more common. Other video information indicating that the video includes large portions of zero motion video can also be used.

C. Regional Application of Fast Sub-Pixel Interpolation Schemes During Motion Estimation For many video applications (e.g., video conferencing), some regions of the video frame being encoded have subject matter that is moving or active, whereas the remainder of the video frame is stationary (or nearly stationary). The benefits of the disclosed technology can be realized for such applications by performing motion estimation with a higher-complexity sub-pixel interpolation scheme for one or more first regions (moving regions) while using a lower-complexity sub-pixel interpolation scheme for a second region that surrounds the one or more first regions (the surrounding non-moving region). The lower-complexity sub-pixel interpolation scheme for the non-moving region can be any of the lower-complexity schemes introduced herein (e.g., any of the lower-complexity schemes disclosed in Section VII.A or VII.D). This section introduces several approaches to such regional application of fast sub-pixel interpolation schemes during motion estimation. These approaches facilitate encoding operations with improved computational efficiency, faster speeds, reduced power, and/or reduced memory usage and demand. The approaches described herein for performing motion estimation can be applied when encoding any type of video. In particular, however, performing motion estimation as described herein can improve performance when encoding video content for video conference applications.

Figure 12:
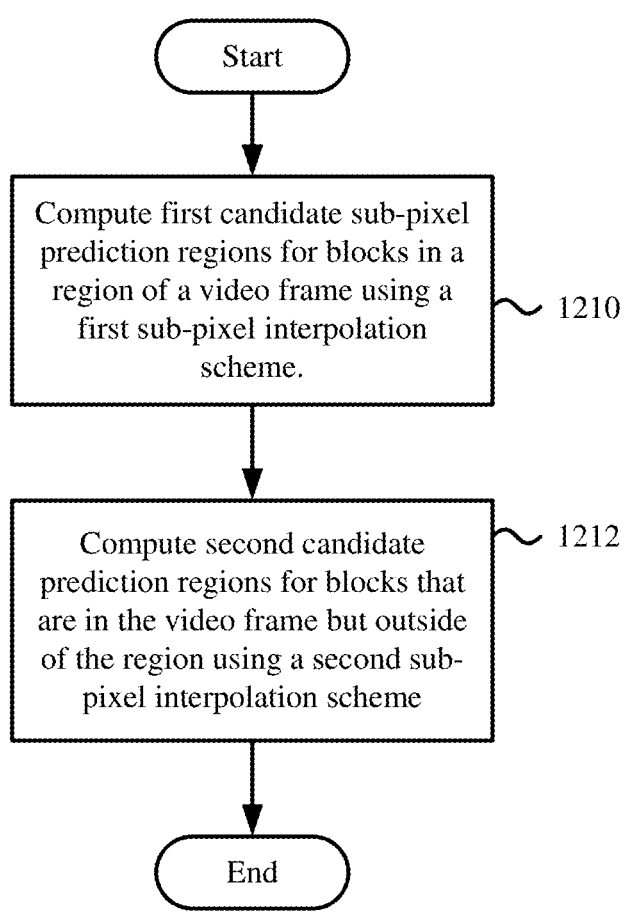
FIG. 12 is a flow chart showing an example embodiment for implementing an encoding technique in which one or more regions of a frame being encoded use a sub-pixel interpolation scheme for motion estimation that is different than the sub-pixel interpolation scheme used for the remainder of the frame.

FIG. 12 is a flow chart (1200) showing an example embodiment for implementing an encoding technique in which one or more regions of a frame being encoded use a sub-pixel interpolation scheme for motion estimation that is different than the sub-pixel interpolation scheme used for the remainder of the frame. In particular implementations, the sub-pixel interpolation scheme used for the one or more regions has a higher computational complexity than the portions of the frame outside of the regions (e.g., on account of the regions being regions in which motion occurs). The particular operations or sequence of operations should not be construed as limiting, as they can be performed alone or in any combination or subcombination with one another. Additionally, the illustrated operations can be performed together with one or more other operations. Still further, the identified operations need not be performed by a single software module, but can be implemented using multiple modules or software tools. The method acts illustrated in flowchart (1200) are performed during encoding of a frame of digital video media and are performed by a video encoder.

At (1210), during motion estimation for the frame, first candidate sub-pixel prediction regions are computed for blocks of video media data in a region of a video frame using a first sub-pixel interpolation scheme. At (1212), during motion estimation for the frame, second candidate prediction regions are computed for blocks of video media data that are in the video frame but outside of the region using a second sub-pixel interpolation scheme. In the illustrated embodiment, the first sub-pixel interpolation scheme has a higher computational complexity than the second sub-pixel interpolation scheme. For instance, the region encoded with the higher-complexity sub-pixel interpolation scheme can correspond to a region of the video frame where movement, or action, is expected to occur, whereas the remainder of the frame can be predicted to have less movement or even be stationary. The lower-complexity sub-pixel interpolation scheme for the non-moving region can be any of the lower-complexity schemes introduced herein; likewise, the higher-complexity sub-pixel interpolation for the moving region(s) can be any of the higher-complexity schemes disclosed herein. Further, in some embodiments, the sub-pixel interpolation scheme that is applied to the blocks of the frame outside of the region expected to have movement (and/or to the region where movement is expected to occur) is adaptively selected from among multiple possible sub-pixel interpolation schemes using any of the techniques for adaptive selection described herein.

FIG. 13 is a schematic block diagram of a picture (1300) being encoded by a video encoder having a single portion of the picture (1302) in which movement is expected to occur and a remainder portion (1301) in which no movement, less movement, or less important movement is expected to occur. FIG. 14 is a similar schematic block diagram of a picture (1400) being encoded by a video encoder having multiple portions of the picture (1402), (1404) in which movement is expected to occur and a remainder portion (1401) in which no movement, less movement, or less important movement is expected to occur. According to the method illustrated in FIG. 12, the portions of the pictures (1302), (1402), (1404) in which movement is expected to occur are encoded using motion estimation with a sub-pixel interpolation scheme of higher-precision (and therefore higher computational complexity) whereas the portions of the pictures (1301), (1401) with little or no expected movement are encoded using motion estimation with a sub-pixel interpolation of lower-precision (and therefore lower computational complexity). These portions of the frame can generally be referred to as the moving portions (1302), (1402), (1404) and the non-moving portions (1301), (1401). The lower-complexity sub-pixel interpolation scheme used for the non-moving region can be any of the lower-complexity schemes introduced herein (e.g., any of the lower-complexity schemes disclosed in Section VII.A or VII.D); likewise, the higher-complexity sub-pixel interpolation scheme used for the moving region(s) can be any of the higher-complexity schemes introduced herein (e.g., any of the higher-complexity schemes disclosed in Section VII.A or VII.D). Situations having a frame that is comprised of one or more moving portions and a remainder non-moving portion commonly arise, for instance, in video conference applications, where the video being encoded is recorded from a stationary camera but the frame includes one or more speakers (who are active and may move) in an environment that does not move (e.g., the surrounding room).

In particular embodiments, the first sub-pixel interpolation scheme (for the moving portions (1302), (1402), (1404) of the frame) uses a sub-pixel interpolation filter having higher numbers of taps than the sub-pixel interpolation filter used in the second sub-pixel interpolation scheme (for the non-moving portions (1301), (1401). For instance, in one example implementation, the lower-complexity second sub-pixel interpolation scheme uses no more than two taps in computing sub-pixel values, whereas the higher-complexity first sub-pixel interpolation scheme uses more than two taps (e.g., the 7- and 8-tap sub-pixel interpolation filters specified by the HEVC standard). In some embodiments, the first sub-pixel interpolation scheme pre-interpolates a higher number of sub-pixel values for a frame than the second sub-pixel interpolation scheme. For example, the second sub-pixel interpolation scheme can omit pre-interpolation of any sub-pixel value for the frame and instead interpolate sub-pixel values as needed during the computing of its candidate prediction regions, whereas the first sub-pixel interpolation scheme can pre-interpolate at least some of the sub-pixel values from the one or more reference frames.

The region to which the higher-complexity sub-pixel interpolation scheme is applied can, in general, correspond to a region in which a majority of the region displays a non-stationary, moving object. For instance, the non-stationary, moving object displayed in the region can be one or more persons (or faces of persons), and the encoding technique can be implemented as part of a video conferencing system.

A variety of techniques can be used to identify the one or more moving portions of the video frame being encoded. For several example techniques disclosed herein, the one or more moving portions are identified by analyzing the immediately previous frame in the video sequence. Thus, the moving portions are portions where movement is expected to occur based on the prediction from this previous frame. FIG. 13 illustrates a first example technique for identifying a moving portion (e.g., moving portion (1302)) from a previously encoded picture (1310), whereas FIG. 14 illustrates a second example technique for identifying one or more moving portions (e.g., moving portions (1402), (1404)) from a previously encoded picture (1410).

With regard to the example technique illustrated in FIG. 13, the moving portion (1302) is a bounded rectangle and is identified from the previous frame (1310) by initially assuming the moving portion (1302) is the size of the entire frame and incrementally trimming the size of the moving portion. In the illustrated implementation, the process of incrementally trimming the size of the moving portion (1302) starts at the frame boundaries and successively analyzes the ratio of skip blocks along directional lines formed by coding tree units (CTUs) (or other units of the frame, such as CUs). For instance, the directional trimming can begin with the CTUs along a top horizontal line of the frame, illustrated as top line (1304) in FIG. 13. The top line (1304) can be a line having a displacement from the top edge corresponding to the smallest CTU along the top edge of the frame, a displacement that varies with the size of the CTUs along the top edge (since CTU sizes can vary), or a displacement that is set (e.g., a displacement of one or more pixels). The number of skip blocks within the CTUs that intersect (or make up the region bounded by) this line can then be computed, as well as the ratio of skip blocks relative to the total number of blocks along the line. If the ratio satisfies some predetermined threshold, it can be determined that the area between the top edge of the currently sized moving portion (set initially as the size of the frame) and the horizontal line is likely to have little or no motion and thus can be "trimmed" from the currently sized moving portion (e.g., the coordinates for the moving portion (1302) can be adjusted downward by the displacement of the line from the top edge). Some of the skip block information that is used during this process can be obtained from a data structure configured to store information useful in making these computations (e.g., a data structure storing the number of coding units (CUs) (blocks) in a CTU as well as the status of the blocks in the CU as being a skip mode block or not). Once an analysis of the top horizontal line is performed, the process can progress in a similar manner by next considering CTUs along a leftward-most vertical line (the leftward-most CTUs intersected by (or bounded) by a leftward vertical line with a displacement from the left edge as described above), then considering CTUs along a rightward-most vertical line (the rightward-most CTUs intersected by (or bounded) by a rightward vertical line having a displacement from the right edge as described above), and then considering CTUs along a bottom line (the bottom-most CTUs intersected by (or bounded by) a bottomward horizontal line with a displacement from the bottom edge as described above). FIG. 13 also illustrates a leftward line (1305) and rightward line (1306) along which the analysis proceeds. Once the top, left, right, and bottom have been considered, and any "trimming" of the moving portion (1302) performed, the process can repeat beginning with the top as trimmed (illustrated as second top line (1307)) and computing the displacements for the lines from the adjusted edges of the currently-sized moving portion.

The progression through the frame (1310) is not limited to this sequence, however, as it can vary and progress in different orders. Further, multiple lines along one direction (and in one region of the frame) can be considered before moving to the next line(s). Further, a variety of termination mechanisms can be used to stop the process once an acceptable region (1302) has been identified. For instance, in one example embodiment, if the skip block ratio along a particular directional line does not meet the threshold, then further trimming along that line and region is stopped, even though further trimming may continue along the other directional lines until no such line has CTUs that satisfy the skip block ratio. This process of incrementally "trimming" the moving portion to a arrive at a final moving portion (1302) can be generally described as identifying the moving region (1302) by iteratively computing a skip block ratio for blocks of video data along multiple directional lines across a previous video frame and trimming those blocks of video data from the region whose skip block ratio exceeds a threshold.

The disclosed technique is suitable for a single region having movement. Further, the disclosed technique is computationally efficient and can quickly locate an acceptable region (1302) for higher-complexity sub-pixel interpolation as well as a remaining non-moving region (1301).

FIG. 14 illustrates another embodiment for identifying one or more moving portions of a frame. The technique illustrated by FIG. 14 is performed on the video frame (1410) immediately preceding in video sequence the frame being encoded (1400), as that previous frame provides a good predictor of movement in the current frame being encoded. Further, in the illustrated example, the technique is used to identify two moving portions (1402), (1404), which can be encoded using a higher-complexity sub-pixel interpolation scheme during motion estimation, whereas the non-moving portion (1401) can be efficiently encoded using a lower-complexity sub-pixel interpolation scheme as described herein.

In the example implementation illustrated by FIG. 14, coding tree units (CTUs) are searched for CUs having motion vectors that exceed a predetermined threshold. For instance, the CTUs of the frame are considered according to a predetermined search pattern (e.g., each CTU is considered in sequence from left-to-right and from top-to-bottom). For each CTU, the CUs of the CTU are evaluated to determine whether they have a motion vector assigned to it that exceeds a predetermined threshold. The threshold can vary from implementation to implementation depending on the desired performance. In general, the threshold is used to identify CUs that exhibit significant motion in the frame and that may desirably be part of a region encoded using a higher-complexity motion estimation scheme. For the first CTU that contains a motion vector exceeding the threshold, the CTU coordinates are added to a first list and is used as a seed to identify the CTUs in a first moving portion of the frame (e.g., the first moving portion (1402)). For the next CTU identified that contains a motion vector exceeding the threshold, an evaluation is made as to whether that CTU is within a threshold distance from the boundary of the CTUs in the first list (e.g., threshold distance (1403)). If the CTU is within the threshold distance, then its coordinates are added to the first list, thereby increasing the number of CTUs in the first list and expanding the size of the moving portion of the frame (1402) associated with the first list; if the CTU is not within the threshold distance, then the CTU coordinates are added to a new list and form the seed for a second moving portion of the frame (e.g., the second moving portion (1404)). As each new CTU having a threshold-meeting motion vector is encountered, it is evaluated to determine whether it is within a threshold distance of the boundary of the CTUs in any existing lists (e.g., threshold distances (1403), (1405)) and either added to the associated list (when it meets the relevant threshold distance) or used to establish a new group of CTUs for use as a new moving portion of the frame. If a CTU is within the threshold distance of the boundary of multiple lists, then it can be added to the list having the closest CTUs. This process continues until the CTUs in the frame (e.g., all CTUs) have been considered.

FIG. 14 shows a previously encoded frame (1410) being analyzed using this technique and shows multiple schematically illustrated moving portions (1402), (1404), (1406) identified in this manner. FIG. 14 furthers shows the associated threshold distances (1403), (1405), (1407) against which subsequently analyzed CTUs having threshold-meeting motion vectors are compared for possible grouping together.

In the illustrated embodiment, after this initial identification of moving portions (e.g., moving portions (1402), (1404), (1406)), a refinement process is performed. The refinement process can generally comprise analyzing the moving portions to determine whether they are likely to represent perceptible movement (which is desirably encoded using a higher-complexity motion estimation scheme) or imperceptible "noise" (which is likely to be safely encoded using a computationally efficient lower-complexity motion estimation scheme). In one implementation, this refinement process comprises evaluating the overall size and/or number of the CTUs in each list and determining whether they meet predetermined threshold(s). For instance, a threshold can be set such that if a particular list for a moving portion comprises only a single CTU, then it is declassified from being treated as a moving portion and encoded using a lower-complexity motion estimation scheme. In FIG. 14, moving portion (1406) represents an example of such a CTU and, as illustrated, is removed from being treated as a moving portion in the picture (1400) being currently encoded.

Thus, in this example implementation, a two-pass process is performed to identify one or more moving portions of a video frame. A first pass identifies candidate moving portions of the frame, and a second-pass removes those candidates considered to be insignificant noise in the frame. This process can be generally described as identifying one or more regions of the video frame to which a higher-complexity sub-pixel interpolation scheme is to be applied by grouping together portions of a previous video frame that have motion vectors that exceed a motion threshold and that neighbor one another by a distance threshold. The process can further comprise a refinement process that comprises evaluating the grouped-together portions of the previous video frame and removing those groups that do not meet a size threshold for treatment as a region to which the higher-complexity sub-pixel interpolation scheme is to be applied during motion estimation.

Other techniques for locating one or more regions (1302), (1402), (1404) of moving objects can also be used. For instance, a variety of segmentation techniques can be used to identify moving portions of a video frame (e.g., segmentation techniques as used in machine vision applications). Still further, for some applications, facial recognition data is computed as part of encoding (e.g., for certain video conferencing application). This facial recognition data can then be used to create one or more bounded rectangles in which higher-complexity sub-pixel interpolation is performed. Further, in some applications, information about the video source may be generated during encoded and useful to identifying the moving regions (1302), (1402), (1404). For instance, if the encoders signals that the video source is for screen video (as opposed to natural video), then this information can be used to identify the moving and non-moving portion(s) of the screen because screen video typically include large portions of nonmoving data.

D. Further Details for Example Sub-Pixel Interpolation Filter Embodiments

In this section, additional detail concerning the sub-pixel interpolation filters used in specific embodiments of the disclosed technology are described. In particular, this section describes in further detail the computationally expensive 7- and 8-tap sub-pixel interpolation filters defined by the HEVC standard and used during motion compensation in embodiments of the disclosed technology. Also disclosed in more detail are the computationally efficient 2-tap sub-pixel interpolation filters used during motion estimation in embodiments of the disclosed technology. In one specific implementation, lower-complexity motion estimation (e.g., available for adaptive selection and/or applied regionally as disclosed herein) involves no pre-interpolation and uses the lower-complexity two-tap filters disclosed in this section, whereas higher-complexity motion estimation (e.g., available for adaptive selection and/or applied regionally) involves pre-interpolation sub-pixel values at half-pixel and quarter-pixel offsets and uses the disclosed HEVC 7- and 8-tap sub-pixel interpolation filters. In this specific implementation, motion compensation is performed using the higher-complexity HEVC 7- and 8-tap sub-pixel interpolation filters in order to maintain compliance with the HEVC standard.

Figure 16:
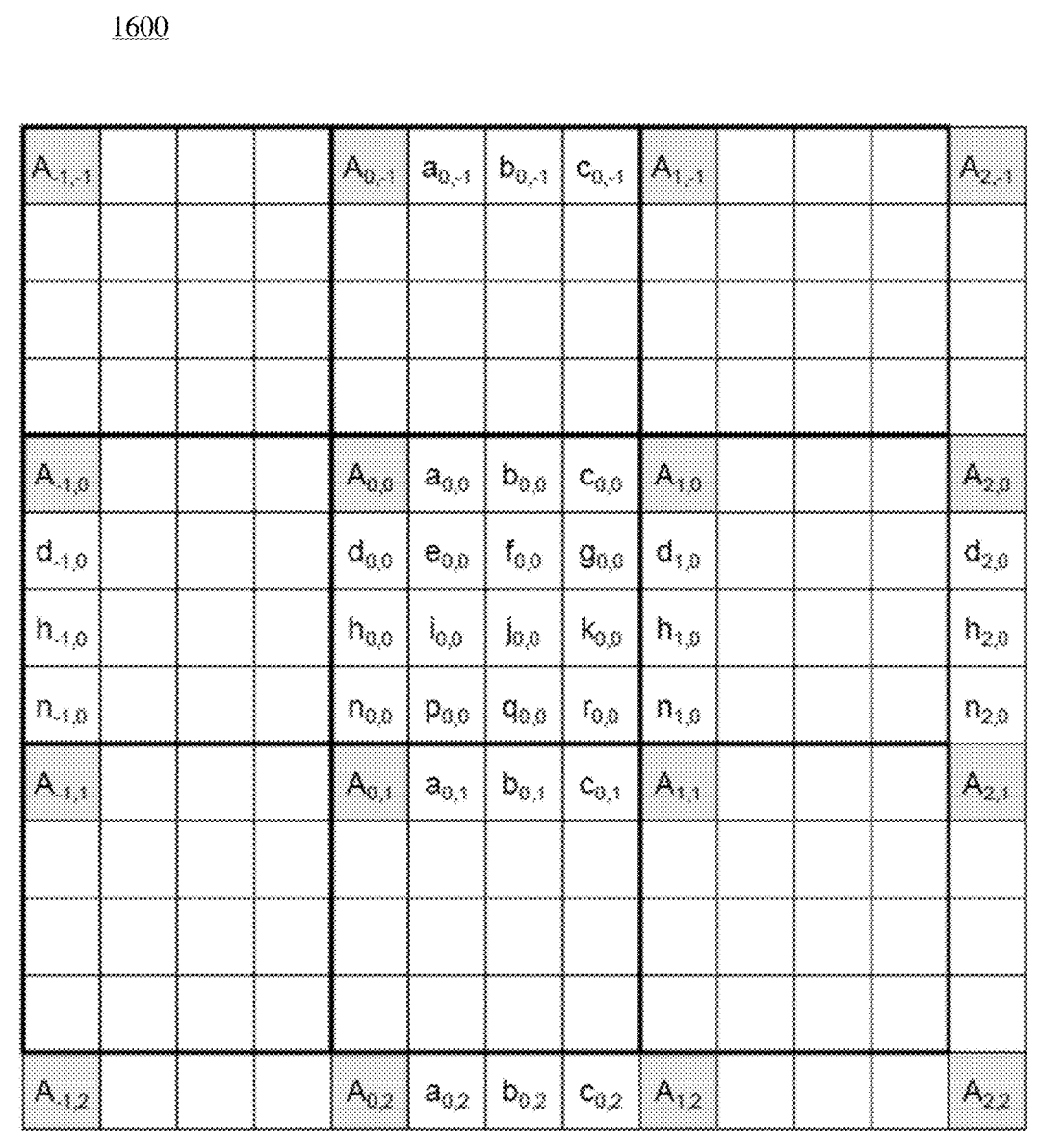

To describe the HEVC sub-pixel interpolation filters, reference is made to diagram (1600) of FIG. 16, which illustrates various integer pixel positions (designated by capital "A" and subscript values i, j indicating the location of the integer pixel (e.g., $A_{i,j}$) and fractional sub-pixel positions (designated by lower case letters indicating their particular sub-pixel position and subscript values i,j indicating their associated integer location (e.g., $b_{i,j}$)). Further, the sub-pixel values at each position are luminance values, which are typically used for motion estimation purposes.

According to the HEVC standard, given the luminance samples $A_{i,j}$ at full-integer sample locations ($A_{i,j}, A_{i,j}$), the luminance samples $a_{0,0}$ to $r_{0,0}$ at fractional (sub-pixel) sample positions are derived as follows:

The sub-pixel samples labelled $a_{0,0}$, $b_{0,0}$, $c_{0,0}$, $d_{0,0}$, $h_{0,0}$, and $n_{0,0}$ are derived by applying an 8-tap filter to the nearest integer position samples as follows:

$$a_{0,0}=(-A_{-3,0}+4A_{-2,0}-10A_{-1,0}+58A_{0,0}+17A_{1,0}-5A_{2,0}+A_{3,0})>>(B-8) \quad (1a)$$

$$b_{0,0}=(-A_{-3,0}+4A_{-2,0}-11A_{-4,0}+40A_{0,0}+40A_{1,0}-11A_{2,0}+4A_{3,0}-A_{4,0})>>(B-8) \quad (1b)$$

$$c_{0,0}=(A_{-2,0}-5A_{-1,0}+17A_{0,0}+58A_{1,0}-10A_{2,0}+4A_{3,0}-A_{4,0})>>(B-8) \quad (1c)$$

$$d_{0,0}=(-A_{0,-3}+4A_{0,-2}-10A_{0,-1}+58A_{0,0}+17A_{0,1}-5A_{0,2}+A_{0,3})>>(B-8) \quad (1d)$$

$$h_{0,0}=(-A_{0,-3}+4A_{0,-2}-11A_{0,-1}+40A_{0,0}+40A_{0,1}-11A_{0,2}+4A_{0,3}-A_{0,4})>>(B-8) \quad (1e)$$

$$n_{0,0}=(A_{0,-2}-5A_{0,-1}+17A_{0,0}+58A_{0,1}-10A_{0,2}+4A_{0,3}-A_{0,4})>>(B-8) \quad (1e)$$

where >> indicates a bit-shift operation (e.g., a right-bit shift) and B is greater than or equal to 8 and is the bit depth of the reference samples. B is typically 8 for most applications. Additional right shifting is later performed in a weighted sample prediction process so that the interpolated sample values have the correct bit depth.

The sub-pixel samples labelled $e_{0,0}$, $i_{0,0}$, $p_{0,0}$, $f_{0,0}$, $j_{0,0}$, $q_{0,0}$, $g_{0,0}$, $k_{0,0}$, and $r_{0,0}$ are derived by applying an 8-tap filter to the samples $a_{0,i}$, $b_{0,i}$ and $c_{0,i}$ with i=−3 . . . 4 in the vertical direction as follows:

$$e_{0,0}=(-a_{0,-3}+4a_{0,-2}-10a_{0,-1}+58a_{0,0}+17a_{0,1}-5a_{0,2}+a_{0,3})>>6 \quad (2a)$$

$$i_{0,0}=(-a_{0,-3}+4a_{0,-2}-11a_{0,-1}+40a_{0,0}+40a_{0,1}-11a_{0,2}+4a_{0,3}-a_{0,4})>>6 \quad (2b)$$

$$p_{0,0}=(a_{0,-2}-5a_{0,-1}+17a_{0,0}+58a_{0,1}-10a_{0,2}+4a_{0,3}-a_{0,4})>>6 \quad (2c)$$

$$f_{0,0}=(-b_{0,-3}+4b_{0,-2}-10b_{0,-1}+58b_{0,0}+17b_{0,1}-5b_{0,2}+b_{0,3})>>6 \quad (2d)$$

$$j_{0,0}=(-b_{0,-3}+4b_{0,-2}-11b_{0,-1}+40b_{0,0}+40b_{0,1}-11b_{0,2}+4b_{0,3}-b_{0,4})>>6 \quad (2e)$$

$$q_{0,0}=(b_{0,-2}-5b_{0,-4}+17b_{0,0}+58b_{0,1}-10b_{0,2}+4b_{0,3}-b_{0,4})>>6 \quad (2f)$$

$$g_{0,0}=(-c_{0,-3}+4c_{0,-2}-10c_{0,-1}+58c_{0,0}+17c_{0,1}-5c_{0,2}+c_{0,3})>>6 \quad (2g)$$

$$k_{0,0}=(-c_{0,-3}+4c_{0,-2}-11c_{0,-1}+40c_{0,0}+40c_{0,1}-11c_{0,2}+4c_{0,3}-c_{0,4})>>6 \quad (2h)$$

$$r_{0,0}=(c_{0,-2}-5c_{0,-1}+17c_{0,0}+58c_{0,1}-10c_{0,2}+4c_{0,3}-c_{0,4})>>6 \quad (2i)$$

According to an example computationally efficient sub-pixel interpolation scheme as disclosed herein, the sub-pixel samples are derived by applying a 2-tap filter (with rounding) as follows:

$$a_{0,0}=(3A_{0,0}+A_{1,0}+2)>>2 \quad (3a)$$

$$b_{0,0}=(A_{0,0}+A_{1,0}+1)>>1 \quad (3b)$$

$$c_{0,0}=(A_{0,0}+3A_{1,0}+2)>>2 \quad (3c)$$

$$d_{0,0}=(3A_{0,0}+A_{0,1}+2)>>2 \quad (3d)$$

$$e_{0,0}=(3A_{0,0}+A_{1,1}+2)>>2 \quad (3e)$$

$$f_{0,0}=(e_{0,0}+g_{0,0}+1)>>1 \quad (3f)$$

$$g_{0,0}=(3A_{1,0}+A_{0,1}+2)>>2 \quad (3g)$$

$$h_{0,0}=(A_{0,0}+A_{0,1}+1)>>1 \quad (3h)$$

$$i_{0,0}=(e_{0,0}+p_{0,0}+1)>>1 \quad (3i)$$

$$j_{0,0}=(A_{0,0}+A_{1,1}+1)>>1 \quad (3j)$$

$$k_{0,0}=(g_{0,0}+r_{0,0}+1)>>1 \quad (3k)$$

$$n_{0,0}=(A_{0,0}+3A_{0,1}+2)>>2 \quad (3l)$$

$$p_{0,0}=(A_{0,1}+3A_{1,0}+2)>>2 \quad (3m)$$

$$q_{0,0}=(p_{0,0}+r_{0,0}+1)>>1 \quad (3n)$$

$$r_{0,0}=(A_{0,0}+3A_{1,1}+2)>>2 \quad (3o)$$

As can be seen, these computationally efficient sub-pixel interpolation filters have far fewer taps than the HEVC sub-pixel interpolation filters, resulting in increased computational efficiency. Further, during motion estimation, pre-interpolation can be omitted, further reducing the computational burden experienced during motion estimation.

Additionally, in certain embodiments, motion estimation is performed using a hierarchical search pattern that starts with integer-offset candidate prediction regions, then computes half-pixel-offset prediction regions neighboring the best integer-offset candidate, and, for a selected half-pixel-offset prediction region that is better than the best integer-offset candidate, computes quarter-pixel-offset prediction regions neighboring the best half-pixel-offset candidate. Thus, it should be understood that, in such embodiments, only those prediction regions called upon by the search pattern are computed during motion estimation.

VIII. Concluding Remarks

Having illustrated and described the principles of the disclosed technology, it will be apparent to those skilled in the art that the disclosed embodiments can be modified in arrangement and detail without departing from such principles. For example, any one or more aspects of the disclosed technology can be applied in other embodiments and environments. Additionally, the disclosed technology is not limited to use with any particular video codec standard, but can be adapted for use in connection with any suitable video codec or video application.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims and their equivalents. We therefore claim as our invention all that comes within the scope and spirit of these claims and their equivalents.

What is claimed is:

1. A video encoder, comprising:
one or more computing devices programmed or configured to perform a video encoding method, the video encoding method comprising:
adaptively selecting one sub-pixel interpolation scheme from among multiple available sub-pixel interpolation schemes for use during a motion estimation process for a block of video media data in a video frame, the adaptively selecting being performed without performing the multiple available sub-pixel interpolation schemes; and
performing the motion estimation process using the selected sub-pixel interpolation scheme, the motion estimation process comprising (a) computing multiple candidate prediction regions from one or more reference frames, the candidate prediction regions predicting motion of a block of video media data in a video frame being encoded, at least some of the candidate prediction regions being computed using the adaptively selected sub-pixel interpolation scheme, and (b) selecting one of the candidate prediction regions for the block of video media data from among the multiple candidate prediction regions
wherein the adaptively selecting comprises:
computing a metric indicating a predicted degree of object movement in the video frame being encoded;
comparing the metric to a threshold; and
selecting one of the multiple available sub-pixel interpolation schemes based at least in part on the comparison,
wherein the metric indicating the predicted degree of object movement in the video frame being encoded is a skip block ratio indicating a number of blocks in an adjacent previous frame that were encoded in a skip mode relative to a total number of blocks in the adjacent previous frame.

2. The video encoder of claim 1, wherein the adaptively selected sub-pixel interpolation scheme uses a first sub-pixel interpolation filter,
wherein the selected one of the candidate prediction regions is at a sub-pixel offset, and
wherein the video encoding method further comprises performing motion compensation for the selected one of the candidate prediction regions, the motion compensation comprising computing the selected one of the candidate prediction regions using a second sub-pixel interpolation filer, the second sub-pixel interpolation filter having higher computational complexity than the first sub-pixel interpolation filter.

3. The video encoder of claim 1, wherein the multiple available sub-pixel interpolation schemes include a first sub-pixel interpolation scheme and a second sub-pixel interpolation scheme, and
wherein the first sub-pixel interpolation scheme uses a sub-pixel interpolation filter having a higher numbers of taps than any sub-pixel interpolation filter used in the second sub-pixel interpolation scheme.

4. The video encoder of claim 1, wherein the multiple available sub-pixel interpolation schemes include a first sub-pixel interpolation scheme and a second sub-pixel interpolation scheme, and
wherein the first sub-pixel interpolation scheme pre-interpolates a higher number of sub-pixel values for a frame than the second sub-pixel interpolation scheme.

5. The video encoder of claim 1, wherein the multiple available sub-pixel interpolation schemes include a first sub-pixel interpolation scheme and a second sub-pixel interpolation scheme, and
wherein the second sub-pixel interpolation scheme omits pre-interpolation of any sub-pixel value for the video frame.

6. A video encoder, comprising:
one or more computing devices programmed or configured to perform a video encoding method, the video encoding method including a motion estimation process comprising:
computing first candidate sub-pixel prediction regions for blocks of video media data in one or more regions of a video frame using a first sub-pixel interpolation scheme; and
computing second candidate prediction regions for blocks of video media data that are in the video frame but outside of the one or more regions using a second sub-pixel interpolation scheme, the first sub-pixel interpolation scheme having a higher computational complexity than the second sub-pixel interpolation scheme, wherein the motion estimation process further comprises identifying the one or more regions of the video frame to which the first sub-pixel interpolation scheme is applied by iteratively computing a skip block ratio for blocks of video data along multiple directional lines across a previous video frame and trimming those blocks of video data from a region whose skip block ratio exceeds a threshold.

7. The video encoder of claim 6, wherein the first sub-pixel interpolation scheme uses a sub-pixel interpolation filter having higher numbers of taps than a sub-pixel interpolation filter used in the second sub-pixel interpolation scheme.

8. The video encoder of claim 6, wherein the first sub-pixel interpolation scheme pre-interpolates a higher number of sub-pixel values for a frame than the second sub-pixel interpolation scheme.

9. The video encoder of claim 6, wherein the second sub-pixel interpolation scheme uses no more than two taps in computing sub-pixel values.

10. The video encoder of claim 6, wherein the one or more regions of the video frame to which the first sub-pixel interpolation scheme is applied comprise one or more persons in the video frame, and wherein the video encoder is employed as part of a video conferencing system.

11. The video encoder of claim 6, wherein the motion estimation process further comprises identifying the one or more regions of the video frame to which the first sub-pixel interpolation scheme is applied by grouping together portions of a previous video frame that have motion vectors that exceed a motion threshold and that neighbor one another by a distance threshold.

12. The video encoder of claim 11, wherein the motion estimation process further comprises evaluating the grouped together portions of the previous video frame to remove groups that do not meet a size threshold for treatment as a region to which the first sub-pixel interpolation scheme is applied during motion estimation.

13. One or more computer-readable memory or storage devices storing computer-executable instructions which when executed by a computer cause the computer to perform a motion estimation process, comprising:

computing first candidate sub-pixel prediction regions for blocks of video media data in one or more regions of a video frame using a first sub-pixel interpolation scheme; and computing second candidate prediction regions for blocks of video media data that are in the video frame but outside of the one or more regions using a second sub-pixel interpolation scheme, the first sub-pixel interpolation scheme having a higher computational complexity than the second sub-pixel interpolation scheme, wherein the motion estimation process further comprises identifying the one or more regions of the video frame to which the first sub-pixel interpolation scheme is applied by iteratively computing a skip block ratio for blocks of video data along multiple directional lines across a previous video frame and trimming those blocks of video data from the region whose skip block ratio exceeds a threshold.

14. The one or more computer-readable memory or storage devices of claim 13, wherein the first sub-pixel interpolation scheme uses a sub-pixel interpolation filter having higher numbers of taps than a sub-pixel interpolation filter used in the second sub-pixel interpolation scheme.

15. The one or more computer-readable memory or storage devices of claim 13, wherein the first sub-pixel interpolation scheme pre-interpolates a higher number of sub-pixel values for a frame than the second sub-pixel interpolation scheme.

16. The one or more computer-readable memory or storage devices of claim 13, wherein the second sub-pixel interpolation scheme uses no more than two taps in computing sub-pixel values.

17. The one or more computer-readable memory or storage devices of claim 13, wherein the one or more regions of the video frame to which the first sub-pixel interpolation scheme is applied comprise one or more persons in the video frame, and wherein a video encoder is employed as part of a video conferencing system.

* * * * *